(12) United States Patent
Bagepalli et al.

(10) Patent No.: US 10,883,771 B2
(45) Date of Patent: Jan. 5, 2021

(54) HEAT SINK VESSEL

(71) Applicant: Aestus Energy Storage, LLC, Pittsford, NY (US)

(72) Inventors: Bharat Bagepalli, Niskayuna, NY (US); Thomas Wagner, Troy, NY (US); Ercan Dumlupinar, Boston, MA (US)

(73) Assignee: Aestus Energy Storage, LLC, Pittsford, NY (US)

( * ) Notice: Subject to any disclaimer, the term of this patent is extended or adjusted under 35 U.S.C. 154(b) by 0 days.

(21) Appl. No.: 16/197,598

(22) Filed: Nov. 21, 2018

(65) Prior Publication Data

US 2019/0086159 A1 Mar. 21, 2019

Related U.S. Application Data

(60) Provisional application No. 62/588,997, filed on Nov. 21, 2017.

(51) Int. Cl.
*F28D 20/00* (2006.01)
*C04B 35/106* (2006.01)
(Continued)

(52) U.S. Cl.
CPC ........ *F28D 20/0056* (2013.01); *C04B 35/106* (2013.01); *C04B 35/195* (2013.01);
(Continued)

(58) Field of Classification Search
CPC ..... F28D 2020/0056; F28D 2020/0065; F28D 20/21; F28D 20/0056; F28D 20/0065;
(Continued)

(56) References Cited

U.S. PATENT DOCUMENTS

| 1,732,829 A | 10/1929 | Boardman |
| 3,189,471 A | 6/1965 | Thomas |

(Continued)

FOREIGN PATENT DOCUMENTS

| GB | 2173886 A | 10/1986 |
| JP | S53-93436 A | 8/1978 |
| WO | 2016/042188 A1 | 3/1916 |

OTHER PUBLICATIONS

"Unifrax Product Information Sheet," Unifrax, LLC, 2008, https://www.unifrax.com/wp-content/uploads/2018/08/C-1404.pdf.

(Continued)

*Primary Examiner* — Tho V Duong
*Assistant Examiner* — Raheena R Malik
(74) *Attorney, Agent, or Firm* — DLA Piper LLP (US)

(57) ABSTRACT

A heat sink vessel is disclosed herein. The heat sink vessel includes a body and one or more heating media. The body defines an inner volume. The body includes an upper portion, a middle portion, and a lower portion. The upper portion has a conical entrance for incoming flow of fluid. The middle portion has a first side and a second side. The middle portion interfaces with the upper portion of the first side. The lower portion interfaces with the middle portion on the second side. The lower portion includes an inverted perforated conical liner and a perforated plate. The inverted perforated conical liner and the perforated plate control the flow of fluid exiting the vessel. The one or more heating media is disposed in the inner volume. The one or more heating media is configured to store heat during processing.

19 Claims, 22 Drawing Sheets

(51) Int. Cl.
*C04B 35/195* (2006.01)
*C09K 5/14* (2006.01)
*F28F 9/02* (2006.01)
*F28F 21/04* (2006.01)
*F28D 17/02* (2006.01)
*F28D 17/00* (2006.01)

(52) U.S. Cl.
CPC .............. *C09K 5/14* (2013.01); *F28F 9/0263* (2013.01); *F28F 21/04* (2013.01); *C04B 2201/30* (2013.01); *C04B 2235/3217* (2013.01); *C04B 2235/3244* (2013.01); *C04B 2235/3481* (2013.01); *F28D 17/005* (2013.01); *F28D 17/02* (2013.01); *F28D 2020/0065* (2013.01)

(58) Field of Classification Search
CPC ........ F28D 17/005; F28D 17/02; F28D 7/103; Y02E 60/142; C04B 35/106; C04B 35/195; C04B 2201/30; C04B 2235/3217; C04B 2235/3244; C04B 2235/3481; F28F 9/0263; F28F 21/04
USPC .................................................. 165/10, 135
See application file for complete search history.

(56) References Cited

U.S. PATENT DOCUMENTS

| | | | |
|---|---|---|---|
| 3,624,356 A * | 11/1971 | Havill | F24H 7/002 219/530 |
| 4,069,751 A | 1/1978 | Gronwick et al. | |
| 4,346,753 A * | 8/1982 | Kletch | F28D 17/02 165/9.1 |
| 4,727,930 A | 3/1988 | Bruckner et al. | |
| 5,165,452 A | 11/1992 | Cheng | |
| 6,371,198 B1 * | 4/2002 | Hirano | F28D 20/0056 126/617 |
| 7,156,155 B2 * | 1/2007 | Kudo | F28D 20/00 165/10 |
| 7,967,999 B2 * | 6/2011 | Tomura | C09K 5/063 165/10 |
| 2003/0022617 A1 | 1/2003 | Gebke et al. | |
| 2004/0029707 A1 | 2/2004 | Beall et al. | |
| 2007/0029064 A1 * | 2/2007 | Baginski | F28D 7/16 165/10 |
| 2011/0048388 A1 * | 3/2011 | Takahashi | F28D 20/023 123/568.11 |
| 2011/0139453 A1 | 6/2011 | Schultz et al. | |
| 2013/0153169 A1 | 6/2013 | Perryman | |
| 2013/0240171 A1 * | 9/2013 | Morgan | F28D 20/026 165/10 |
| 2014/0074314 A1 * | 3/2014 | Niknafs | F28D 20/0056 700/300 |
| 2014/0102663 A1 * | 4/2014 | Ruer | F28D 17/02 165/10 |
| 2015/0256119 A1 * | 9/2015 | Medina et al. | H02S 10/30 136/253 |
| 2016/0281689 A1 * | 9/2016 | Kim et al. | F01K 5/00 |

OTHER PUBLICATIONS

"Technical Data, VersaFlow® 60 Plus," APGreen, Harbison-Walker Refractories, Company and North American Refractories, Co., Oct. 14, 1993.

"Insboard Ceramic Fiber Boards," Harbison-Walker Refractories Company, 2006.

"Panadyne Aluminum Oxide Spheres ($AL_2O_3$)," Panadyne, 2008.

* cited by examiner

HEAT SINK VESSEL

TECHNICAL FIELD

The present disclosure generally relates to improved energy storage, and more particularly to an improved heat sink vessel.

BACKGROUND

Energy storage has entered piloted qualification use in the power generation industry. This technology is drawing the attention of key analysts, such as those at Bloomberg, McKinsey, and Green Tech Media, and is being reported as the next disruptive technology for power generation. For example, over 20 states (e.g., California, Illinois, Hawaii, Texas, Ohio, New York, Oregon, Massachusetts, and Utah) are currently offering incentives to generation providers to pilot battery storage, as a means to smooth renewable energy generation periods, regulate grid frequency, and defer transmission and distribution upgrades. In a specific example, Utah is currently promoting Utility Investment in storage project. Furthermore, there has been a significant cost reduction in battery storage from roughly $1000/kW in 2010 to about $230/kW in 2016.

Additionally, the current state of technology is enabling behind the meter application that can aid in reducing demand charges, replace conventional back-up power, and also, store and dispatch on site renewable generated power. Key analysts in the field have predicted even further cost decrease of battery storage, at a rate of about 10% per year, and a total service generation of about 1 GW by 2018. A portion of the increase will be behind the meter and distributed applications in support of grid upgrade deferral.

There is a need for improved thermal energy storage for renewable energy sources.

SUMMARY

In some embodiments, a heat sink vessel is disclosed herein. The heat sink vessel includes a body and one or more heating media. The body defines an inner volume. The body includes an upper portion, a middle portion, and a lower portion. The upper portion has a conical entrance for incoming flow of fluid. The middle portion has a first side and a second side. The middle portion interfaces with the upper portion of the first side. The lower portion interfaces with the middle portion on the second side. The lower portion includes an inverted perforated conical liner and a perforated plate. The inverted perforated conical liner and the perforated plate control the flow of fluid exiting the vessel. The one or more heating media is disposed in the inner volume. The one or more heating media is configured to store heat during processing.

In some embodiments, a heat sink vessel is disclosed herein. The heat sink vessel includes a body defining an interior volume. The body includes a first portion, a second portion, and an intermediary portion. The first portion includes a conical entrance for incoming flow of fluid. The second portion includes an inverted conical exit for egress of fluid from the interior volume. The intermediary portion is positioned between the first portion and the second portion. The intermediary portion includes a refractory and a heating media. The refractory defines an inner volume of the intermediary portion. The refractory has an opening formed therethrough. The heating media is disposed in the refractory. The heating media is configured to store heat during processing.

In some embodiments, an apparatus is disclosed herein. The apparatus includes a body defining an interior volume. The body includes a refractory, a jacket, and heating media. The refractory defines an inner volume of the intermediary portion. The refractory has an opening formed therethrough. The jacket at least partially surrounds the refractory. The jacket is formed from a material that includes magnesium alumina silica. The heating media is disposed in the inner volume of the refractory. The heating media is configured to store heat during processing.

In some examples, the heating media may be configured to release heat during processing.

BRIEF DESCRIPTION OF THE DRAWINGS

The present disclosure may be understood from the following detailed description when read in connection with the accompanying drawing. It is emphasized that, according to common practice, various features of the drawing may not be drawn to scale. On the contrary, the dimensions of the various features may be arbitrarily expanded or reduced for clarity. Moreover, in the drawing, common numerical references are used to represent like features. Included in the drawing are the following figures.

DETAILED DESCRIPTION

Figure 1A:
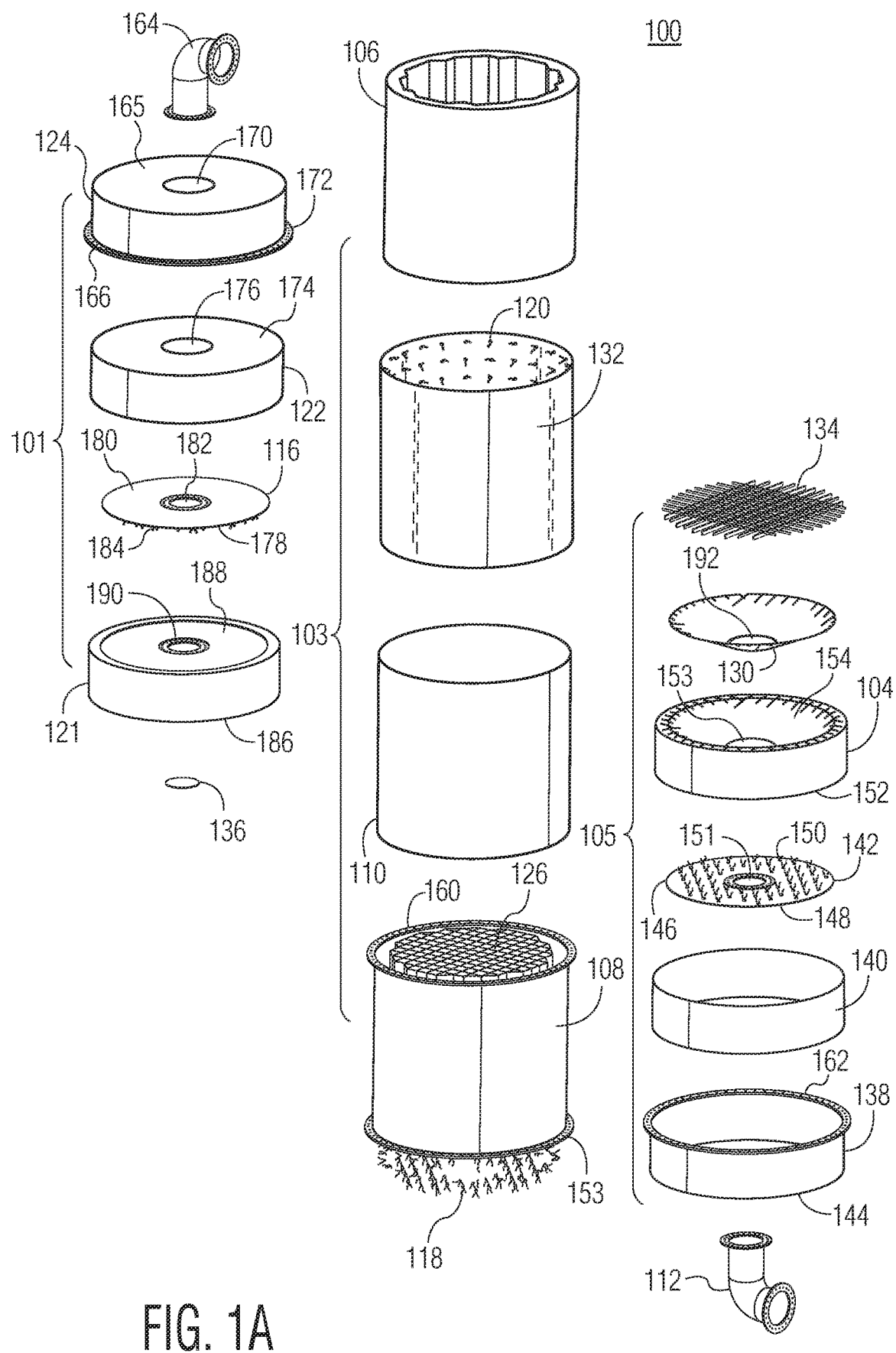
FIG. 1A is an exploded view of a heat sink vessel, according to one embodiment.

Conventional pressure vessel designs typically use high alloy steels or Inconel materials. The cost of these materials is between about $8 and $12, per pound. Fabrication of the pressure vessel typically involves rolling shells into cylinders and forming heads to encapsulate the cylindrical sections. The overall assembly is then welded using full penetration welds. The assembly process can add another $5 to $8 per pound to the vessel cost. These high costs may result in a thermal battery that is uncompetitive with other conventional energy storage methods.

The present disclosure is directed to a thermal storage apparatus embodied in a heat sink vessel that addresses limitations of conventional designs. Heat sink vessels of the present disclosure may use a refractory material that principally comprises magnesium alumina silica or equivalent. Magnesium alumina silica has a plurality of advantages over the conventional material used. For example, magnesium alumina silica may be poured like concrete, thus allowing the material to be easily shaped into a pressure vessel. Pouring the refractor, for example, aids in insulating the vessel, thus allowing for pressure retention using low carbon steel. The cost of the material is approximately $0.60 per pound and the forming cost is also less than $1 per pound. The material also has very favorable insulating properties that are an order of magnitude better than conventional pressure vessel metals. Magnesium alumina silica may also be lined with thin sections of Inconel, which aid in spreading contact loads, thereby supporting heating media contact loads. The Inconel section may also be encapsulated with low carbon steel shells, which have similar costs to the refractory materials. The low carbon steel may be insulated with the refractory material. Low carbon steel is of comparable cost to the refractory material (i.e., approximately $0.40 per pound with forming costs approximately $1 per pound). A wall section may include an Inconel liner (e.g., alloy 625 or equal) a layer of magnesium alumina silica, a ceramic blanket with high insulating value (e.g., thermal conductivity of about 0.15 W/mK or less), and a low carbon steel shell (e.g., at a working temperature of less than about 100° C.).

In addition to the cost advantages of the castable or pourable refractory, the material can also accommodate shaping the interior of the vessel to enhance aerodynamic flow. The vessel includes a conical entrance diffuser for the incoming flow. The conical shape of the entrance diffuser aids in distributing the flow across the vessel diameter (more uniformly). Opposite the conical entrance diffuser, a similar shaped exit is formed that mimics a nozzle to accelerate the flow from the vessel into exit piping.

As previously recited, the vessel may be lined with a layer of Inconel®. For example, the material used may be alloy 625. This material is used to form the cone at the base of the vessel. In one embodiment, the thickness of the Inconel® layer is between about 2 and 3 mm. Such thickness range may aid in improving convenient forming of the vessel. The layer distributes the load of the heat absorbing elements. Also, at the base of the vessel is a perforated plate or tube sheet. The perforated plate or tube sheet is configured to retain the heat absorbing media from entering the lower piping section. The plate may also act as a flow straightener and diffuser to direct the flow into the heat absorbing elements. Each heating media element may aid in further diffusing the flow across the vessel diameter. In some examples, the heating media may include material formed into pebbles of suitable diameter, grains of sand/ceramic and suitable heat absorbing characteristics, to form a bed of pebbles (i.e., a pebble bed). In some embodiments, such as those utilizing a tube sheet, the heat storage media may be isolated from turbine equipment by tubes connected to the tube sheet on top and bottom of the heat storage media volume. In some examples, the heating media may include one or more media having a honeycomb or mesh structure with suitable heat absorbing characteristics. In some examples, the heating media may include a combination of pebbles and one or more honeycomb structures. For a honeycomb application this same configuration can be used with pebble beneath the honeycomb section, to act as flow distribution or the honeycomb can be free standing, without pebbles below the honeycomb section. The honeycomb structure may be supported by shear loading of the honeycomb transferred to the magnesium alumina silica walls. The tube sheet may support the weight of the contained heat sink vessel.

The same conical shapes below and above the honeycomb may diffuse and accelerate flow in similar fashion to the pebble bed design version. For example, above and below the honeycomb may be a diffuser/accelerator assembly. The diffuser/accelerator assembly may include a plurality of cone-shaped liners that are configured to diffuse flow at an entrance (e.g., leading into the honeycomb or pebble bed design) and accelerate flow as a nozzle at the exit (e.g., leading out of the honeycomb or pebble bed design). Similar structures at both the entrance and exit of the honeycomb (or pebble bed design) aid in providing a full diffusion and acceleration of flow through the vessel, and also allows for reversibility of the flow.

FIG. 1A is an exploded view of vessel 100 according to one embodiment. Vessel 100 may include upper section 101, middle section 103, and lower section 105. Upper section 101 interfaces with middle section 103 on a first side thereof. Lower section 105 interfaces with middle section 103 on a second side thereof Lower section 105 may include lower pipe 112, lower outer jacket 138, lower thermal blanket 140, lower plate 142, lower refractory 104, perforated cone liner 130, and cordierite support frame 134. As shown, lower pipe 112 interfaces an opening (not shown) formed in bottom surface 144 of lower outer jacket 138. Lower thermal blanket 140 is positioned at least partially within lower outer jacket 138. For example, lower thermal blanket 140 and lower outer jacket 138 may be concentric, with lower thermal blanket 140 having an outer diameter less than an outer diameter of lower outer jacket 138.

Lower plate 142 generally includes top surface 146, bottom surface 148, and opening 151 formed therein. Top surface 146 may include one or more anchors 150. Each of one or more anchors 150 may be configured to reinforce poured refractory insulation (e.g., lower refractory 104). Lower refractory 104 generally includes top surface 154, bottom surface 152, and opening 153 formed therein. Top surface 146 of lower plate 142 interfaces with bottom surface 152 of lower refractory 104, such that opening 153 of lower refractory 104 and opening 151 of lower plate 142 align. Collectively, lower refractory 104 and lower plate 142 are positioned within an inner circumference of lower thermal blanket 140. When positioned within thermal blanket 140, openings 151, 153 align with the opening formed in lower outer jacket 138 and an opening in lower pipe 112. In one embodiment, lower refractory 104 includes a pocket beneath lower plate 142. The pocket may aid in facilitating gas flow within vessel 100.

Top surface 154 of lower refractory 104 is conically shaped. For example, the cross section area with respect to a plane perpendicular to an axis of lower refractory 104 may decrease from a base of lower refractory 104 to top surface 104. Perforated cone liner 130 is positioned in bottom surface 153 of lower refractory 104. Perforated cone liner 130 may generally take the form of a frustum. Thus, rather than the sloped walls of the cone coming to a point, the slope walls of perforated cone liner 130 may come to a flat base. Thus, perforated cone liner 130 has a first base with a first diameter and a second base with a second diameter, where the second diameter is smaller than the first diameter. Perforated cone liner 130 includes perforated plate 192 positioned at the second base. Perforated plate 192 aligns with opening 153 of the lower refractory. Perforated plate 192 is manufactured to withstand direct contact with heating media disposed in vessel 100. In one embodiment, side walls of perforated cone liner 130 may be thicker than perforated plate 192. For example, side walls may have a thickness of 3 mm, while perforated plate 192 may have a thickness of 14 mm. Thus, perforated plate 192 may allow gasses to flow through plate 192 and may also be able to withstand direct weight load of any heating media positioned thereon.

Baffle (not shown) may, optionally, be positioned over the opening of perforated cone liner 130. The baffle may be configured to control flow of a fluid through cone liner 130.

Cordierite support frame 134 may be positioned on lower refractory 104. For example, cordierite support frame 134 may be positioned on top surface 154 of lower refractory 104, such that cordierite support frame 134 at least partially covers perforated cone liner 130.

In some examples, the lower portion 105 may include a set of conical surfaces to direct flow from vessel 100 into interconnecting system piping. In some examples, inverted perforated conical liner 130 and perforated plate 192 may operate as a nozzle, and may accelerate the acceleration of fluid exiting vessel 100. In some examples, heating media 126 may be configured to release heat during processing.

Middle section 103 includes middle jacket 108, middle thermal blanket 110, anchor cage 132 having anchors 120, middle refractory 106, and heating storage element 126. Middle jacket 108 includes upper flange 160 and lower flange 153. Lower flange 153 interfaces with flange 162 of lower outer jacket 138. Generally, heating storage element 126 may be composed of a network of pipes (or tubes or passageways) that are surrounded by ceramic particles or actual sand (e.g., silicon oxide). For example, upper outer jacket 124 may allow flow through the tubes and prohibit the transfer of the ceramic particles into the flow path that includes turbine equipment. For purposes of this discussion, however, heating storage element 126 may take the form of a cordierite block. Accordingly, discussion of heating storage element 126 may be referred to as "cordierite block 126." Cordierite block 126 may be positioned within middle jacket 108. For example, cordierite block 126 may be positioned within an inner circumference of middle jacket 108. One or more anchors 118 may be positioned in middle jacket 108. Anchor(s) 118 may be configured to aid in supporting cordierite block 126 within middle jacket 108, as well as coupling middle section 103 with upper section 101.

Thermal blanket 110 may be positioned within middle jacket 108. For example, thermal blanket 110 may be concentric with middle jacket 108, with an outer diameter of thermal blanket 110 being less than an inner diameter of middle jacket 108. Thermal blanket 110 and middle jacket 108 may at least partially surround cordierite block 126.

Anchor cage 132 may be positioned within thermal blanket 110. For example, anchor cage 132 may be concentric with thermal blanket 110, with an outer diameter of anchor cage 132 being less than an inner diameter of thermal blanket 110.

Middle refractory 106 may be positioned within anchor cage 132. For example, middle refractory 106 may be concentric with anchor cage 132, with an outer diameter of middle refractory 106 being less than an inner diameter of anchor cage 132. Anchor cage 132 may include one or more anchors 120 that aid in the positioning of middle refractory 106 within anchor cage 132. Middle refractory 106 at least partially surrounds cordierite block 126.

Upper section 101 may include upper pipe 164, upper outer jacket 124, upper thermal blanket 122, upper plate 116, and upper refractory 121. Although not visible in FIG. 1A, similar to lower section 105, upper section 101 further includes a perforated cone liner and a cordierite support frame, similar to those described above. Because upper section 101 is similar to lower section 105 (e.g., similar geometries), vessel 100 is able to provide reversible flow of fluid therethrough. Accordingly, the flow for charging and discharging heating storage element 126 may be reversed.

Upper outer jacket 124 includes top surface 168, bottom surface 166, opening 170, and may be coupled to upper flange 160 of middle jacket 108. Upper pipe 164 interfaces opening 170 formed in top surface 166 of upper outer jacket 124. Upper thermal blanket 122 is positioned at least partially within upper outer jacket 124. For example, upper thermal blanket 122 and upper outer jacket 124 may be concentric, with upper thermal blanket 122 having outer diameter less than inner diameter of upper outer jacket 124. Upper thermal blanket 122 has top surface 174 have opening 176 formed therein. Opening 176 may partially align with opening 170 of upper outer jacket 124.

Upper plate 116 generally includes top surface 180, bottom surface 178, and opening 182 formed in the upper plate 116. Bottom surface 178 may include one or more anchors 184. Upper refractory 121 generally includes top surface 188, bottom surface 186, and opening 190 formed in top surface 188. Bottom surface 178 of upper plate 116 interfaces with top surface 188 of upper refractory 121, such that opening 190 of upper refractory 121 and opening 182 of upper plate 116 align. Collectively, upper refractory 121 and upper plate 116 are positioned within an inner circumference of upper thermal blanket 122. When positioned within thermal blanket 122, openings 182, 190 align with opening 170 formed in upper outer jacket 124.

Bottom surface 186 of the upper refractory 121 may be conically shaped. For example, bottom surface 186 of upper refractory 121, similar to lower refractory 104, generally slopes towards opening 190 formed in upper refractory 121. In embodiments in which upper portion 101 includes a perforated cone liner (similar to liner 130) and cordierite support frame (similar to frame 134), the perforated cone liner may be positioned in bottom surface 186 of upper refractory 121. In some examples, the perforated cone liner (in upper refractory 121) may include a perforated plate similar to perforated plate 192. The perforated plate may align with opening 190 of upper refractory 121.

Baffle 136 may be positioned over opening 190 of upper refractory 121. In embodiments where upper refractory includes a perforated cone liner, baffle 136 may also be positioned over opening of the perforated cone liner. Baffle 136 may be configured to control flow of a fluid through upper refractory 121.

In some examples, a cordierite support frame may be positioned on upper refractory 121. For example, cordierite support frame may be positioned on bottom surface 186 of upper refractory 121, such that the cordierite support frame at least partially covers the perforated cone liner (in upper refractory 121).

As such, the fluid may enter upper pipe 164 and travel through upper section 101 through opening 170 formed in upper outer jacket 124, opening 176 of upper thermal blanket 122, opening 182 of upper plate 116, and opening 190 of upper refractory 121.

Generally the refractory walls and jackets aid in retaining the heat of vessel 100. Refractory walls also allow for overall pressure retention using low cost low carbon steel.

In some examples, conical entrance of the first portion 101 may operate as a flow distribution system, such as a diffuser of the incoming fluid. In some examples, the inverted conical exit of second portion 105 may operate as a nozzle, for egress of the fluid. In some examples, the refractory may include a ceramic, with a specific heat and density as described herein. In some examples, one or more components of the intermediary portion 103 (and/or the heating media 126) may be configured to heat heating media 126. In some examples, heating media 126 may include a specific boost heater disposed prior to the inlet to the media.

In an embodiment, vessel 100 may be formed by creating a plug to represent the interior space of vessel 100 and using a thin steel shell to support the anchors. Anchors may be spot welded to the shell. This form may then be filled with magnesium alumina silica material. The material may then be mixed with water and poured into the form. Following curing of the refractory, the outside may be wrapped with a ceramic blanket for added insulation. The assembly may then be inserted in the steel outer shell. This shell may be formed by rolling sheet steel and welding flanges to the junctions to create a pressure boundary. The steel may be insulated from heating media by refractory and blanket, such that the working temperature is within the range of steel service.

Figure 1B:
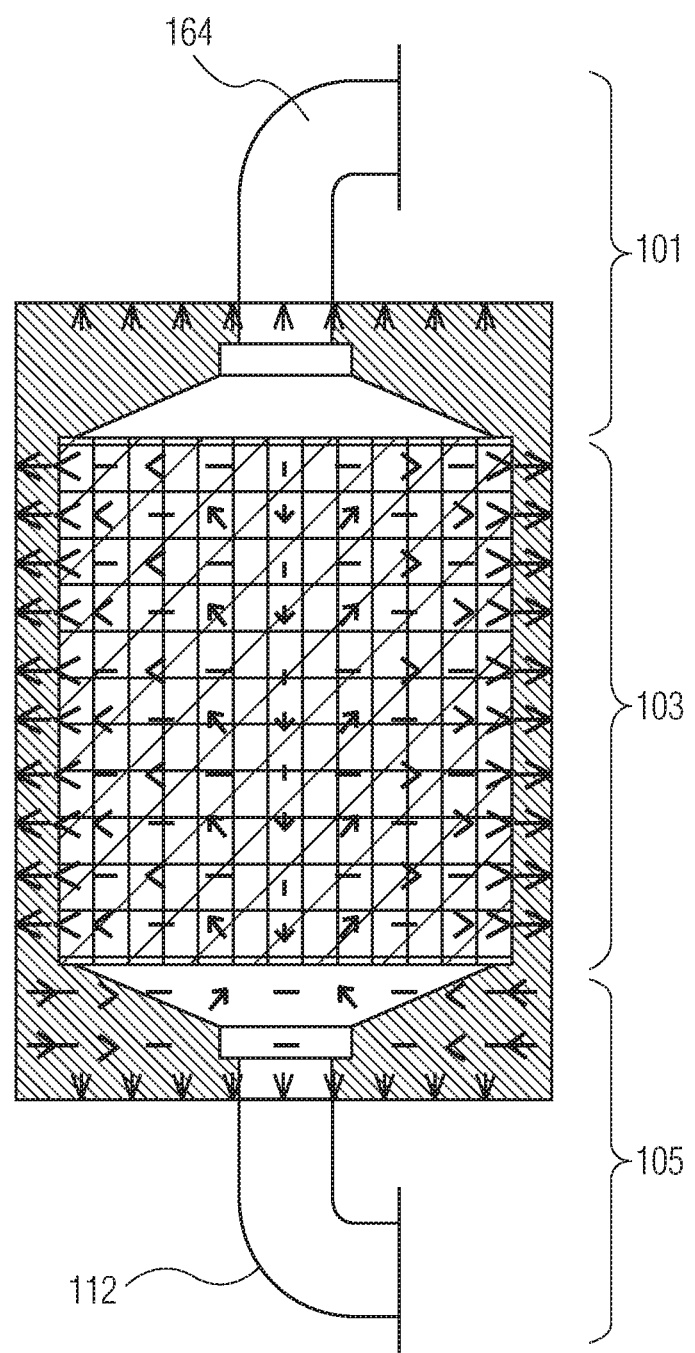
FIG. 1B is a schematic view of the heat sink vessel shown in FIG. IA, according to one embodiment.

When assembled, as shown in multiple views in FIG. 1B, fluid may flow into vessel 100 via upper pipe 164, pass through upper portion 101, middle portion 103, lower portion 105, and exit vessel 100 through lower pipe 112.

Generally, vessel 100 may be used in a thermal energy storage system (TESS). The TESS may use a solid mass to store heat. The stored heat may be used to drive a turbine expander to create torque to drive a generator for power production. This system is a reversible thermodynamic cycle, which means the system may be operated to also produce heat by compressing the working fluid with the turbo system being driven by a motor.

The heat storage media candidates may include solid spheres or tubes that have a high specific heat and also a high density. Example materials include, but are not limited to, an iron-aluminum metal, KANTHAL®, an aluminum oxide ceramic, and an alumina silica honeycomb or mesh (e.g., cordierite, as illustrated above).

Each of these materials has a relatively high value of specific heat and density, two properties that aid in storing heat energy. For example, the materials may have specific heats above 0.7 kJ/kgK and densities above 1900 kg/m$^3$. A variety of metals, ceramics, and minerals meet these criteria. In the current example, the materials used for discussion are KANTHAL®, aluminum oxide and cordierite. As understood by one of ordinary skill in the art, other materials (e.g., concrete, granite, gravel, chopped steel) may be used. These example materials may be more conducive to modeling, and may be easily formed into geometric spheres or tubes.

For example, KANTHAL® has a specific heat of 0.72 kJ/kgK and density of 7100 kg/m$^3$. In one embodiment, the KANTHAL® may be formed into spheres. Studies using this material have shown the material fully capable of the heat store and multiple discharge cycles.

As another example, aluminum oxide has a specific heat of 0.88 kJ/kgK and a density of 3720 kg/m$^3$. This material is also fully capable of storing and discharging heat loads in a cyclic fashion and has the added advantage of a total weight of about 416 metric tons, which may be suitable for storage of 20 MWh of thermal energy.

As another example, cordierite has a specific heat of 1.15 kJ/kgK and a density of 1900 kg/m$^3$. This material is also fully capable of storing and discharging heat loads in a cyclic fashion and has the added advantage of a total weight of 320 metric tons.

Figure 6:
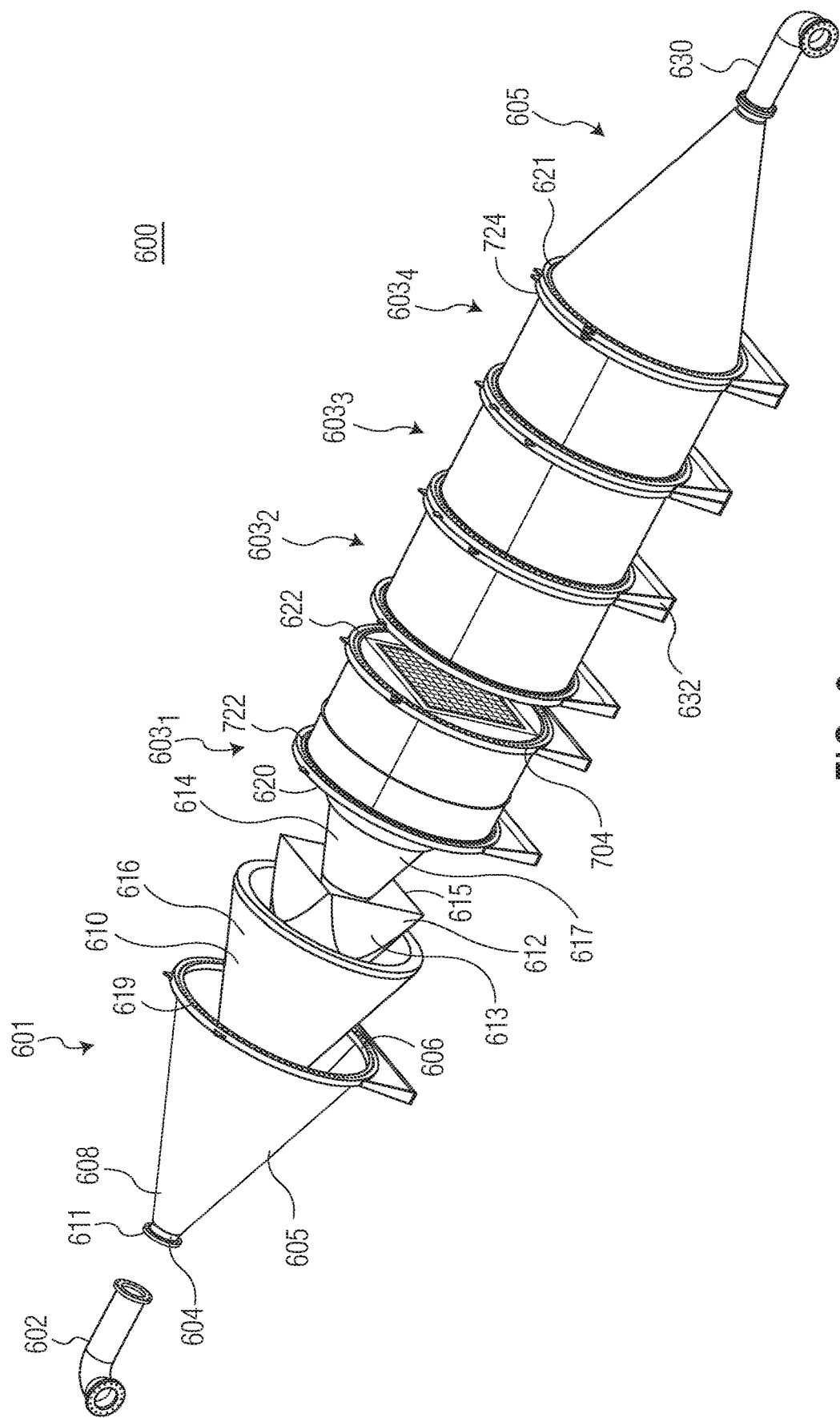
FIG. 6 is an exploded view of a heat sink vessel, according to one exemplary embodiment.

FIG. 6 is an exploded view of vessel 600 according to one embodiment. Vessel 600 is similar to vessel 100. Vessel 600 may include a first section 601, a second section 605, and one or more intermediary sections 6031, 6032, 6033, and 6034 (hereinafter "intermediary section 603"). Although vessel 600 is illustrated with four intermediary sections 603, those skilled in the art would readily understand that vessel 600 may include as few as one intermediary section 603. As illustrated, first section 601 may interface with intermediary section 603 on a first side thereof. Second section 605 may interface with intermediary section 603 on a second side thereof.

First section 601 may include first pipe 602, first outer jacket 608, first refractory 610, cone liner 612, and cone insulation 614. First outer jacket 608 may include a first surface 604 and a second surface 606 opposite first surface 604. First outer jacket 608 may further include a curved surface 605 that extends from first surface 604 to second surface 606. As illustrated, curved surface 605 may slope negatively from first surface 604 to second surface 606, thus forming a conically shaped outer jacket.

First pipe 602 may interface with an opening 611 formed in top surface 604 of first outer jacket 608. First refractory 610 may include a cone-shaped body 616. First refractory 610 may be positioned at least partially within first outer jacket 608. For example, first outer jacket 608 may have a base circumference that is larger than a base circumference of first refractory 610. Although not shown, first refractory 610 includes an opening formed in a top surface thereof, such that the opening of first refractory 610 at least partially aligns with opening 611 formed in first outer jacket 608. In other words, first refractory 610 may be at least partially nested within first outer jacket 608. In some examples, cone-shaped body 616 of first refractory 610 may be formed from cast alumina silicate insulation.

First cone liner 612 may include a conical shaped body 613 having a quadrilateral shaped base 615. Conical shaped body 613 may be a ceramic liner which, in some examples, may be formed from cast cordierite. As shown, first cone liner 612 may be at least partially positioned within first refractory 610. First cone liner 612 may be configured to protect an interior volume of lower refractory 610. First cone liner 612 may include a top surface (not shown) opposite quadrilateral shaped base 615. Top surface may include an opening (not shown) that interfaces with an opening formed in lower refractory 610. The opening of first cone liner 612 may at least partially align with the opening of first refractory 610. Accordingly, the opening of first cone liner 612 may be in fluid communication with first pipe 602.

Figure 7:
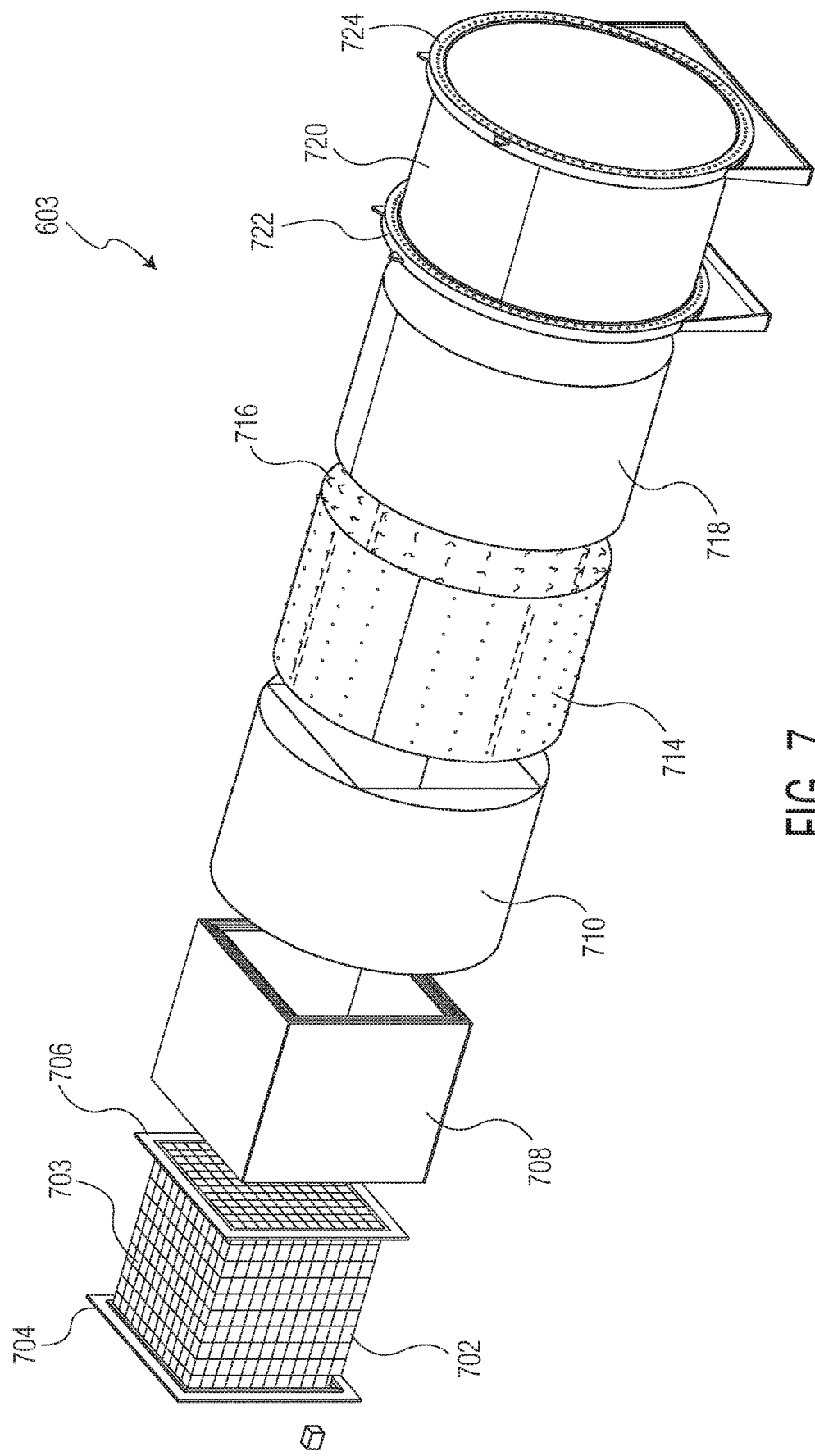
FIG. 7 is an exploded view of an intermediary region of the heat sink vessel shown in FIG. 6, according to one exemplary embodiment.

First insulation 614 may include a conical shaped body 617. Conical shaped body 617 may be formed, in some examples, from a family of cast cordierite cones that diffuse the flow of fluid evenly to cordierite block 702 (FIG. 7). As shown, first insulation 614 may be at least partially positioned within first cone liner 612. First insulation 614 may be configured to insulate first section 601. In some embodiments, the insulation cross-section may include first layer of pourable aluminum silicate; a second layer formed from a fibrous board of aluminate silicate that is shaped around the first layer (or, alternatively, shaped around a carbon steel form used to shape the poured layer); a third layer that includes a ceramic blanket formed from a base composition of alumina silica, that is used to complete the insulation cross section. The insulation cross section may then be inserted in the carbon steel pressure boundary. Equivalent refractory insulations may be used as well.

As such, first section 601 may be comprised of first insulation 614 at least partially positioned within first cone liner 612, first cone liner 612 at least partially positioned within first refractory 610, and first refractory 610 at least partially positioned within first outer jacket 608.

Second section 605 may be similar to first section 601. For example, second section 605 may be configured similarly to first section 601, such that flow through vessel 600 may be reversible. Second section 605 is depicted in a perspective view as compared to first section 603, which is depicted in an exploded view. As such, those skilled in the art will readily understand that second section 605 includes a respective second insulation at least partially positioned within a second cone liner, the second cone liner at least partially positioned within the second refractory, and the second refractory at least partially positioned within the second outer jacket.

First section 601 may interface with intermediary section 603 at a first side 620 of intermediary section 605. Second section 605 may interface with intermediary section 603 at a second side 622 of intermediary section 603. Intermediary section 603 is shown in more detail in FIG. 7.

FIG. 7 is an exploded view of intermediary section 603 of vessel 600 according to one embodiment. Intermediary section 603 may include at least heating media 702, insulation 708, middle refractory 710, anchor cage 714, thermal blanket 718, and outer jacket 720.

Outer jacket 720 may include a first flange 722 on first side 620 and a second flange 724 on second side 622. In some embodiments, first flange 722 may interface with flange 619 of first outer jacket 608. In some embodiments, first flange 722 may interface with second flange 724 of another intermediary section 603. In some embodiments, second flange 724 may interface with flange 621 of second outer jacket of second section 605. In some embodiments, second flange 724 may interface with first flange 722 of another intermediary section 603.

Heating media 702 may be positioned at least partially within outer jacket 720. For example, heating media 702 may be positioned within an inner circumference of outer jacket 720. Thermal blanket 718 may be positioned at least partially within outer jacket 720. For example, thermal blanket 718 may be concentric with outer jacket 720, with an outer diameter of thermal blanket 718 being less than an inner diameter of outer jacket 720. Thermal blanket 718 and outer jacket 720 may at least partially surround heating media 702. In some embodiments, heating media 702 may be formed from cordierite. For example, heating media 702 may take the form of a cordierite block. In some embodiments, heating media 702 may be formed from a ceramic mesh. For example, heating media 702 may be formed from one of alumina oxide, alumina silica, aluminum oxide, or any suitable ceramic material.

Anchor cage 714 may be positioned within thermal blanket 718. For example, anchor cage 714 may be concentric with thermal blanket 718, with an outer diameter of anchor cage 714 being less than an inner diameter of thermal blanket 718. In some embodiments, a fibrous board may also be positioned on the outside of anchor cage 714. A combination of fibrous board and thermal blanket may aid in improved cost and performance. Middle refractory 710 may be positioned within anchor cage 714. For example, middle refractory may be concentric with anchor cage 714, with an outer diameter of middle refractory 710 being less than an inner diameter of anchor cage 714. Anchor cage 714 may include one or more anchors 716 that aid in positioning middle refractory 710 within anchor cage 714. Further, in some embodiments, one or more anchors 716 may aid in positioning anchor cage 714 within thermal blanket 718. In some embodiments, anchors 716 may be used to reinforce poured insulation refractory (e.g., middle refractory 710).

Middle refractory 710 may at least partially surround heating media 702. Insulation 708 may be positioned at least partially within middle refractory 708. Insulation 708 may be polygonal-shaped. For example, as illustrated, insulation 708 may be quadrilateral-shaped. Insulation 708 may be configured to at least partially surround heating media 702. For example, heating media 702 may include a body 703 having a first flange 704 and a second flange 706. Insulation 708 may be positioned about body 703 between first flange 704 and second flange 706.

Figure 8:
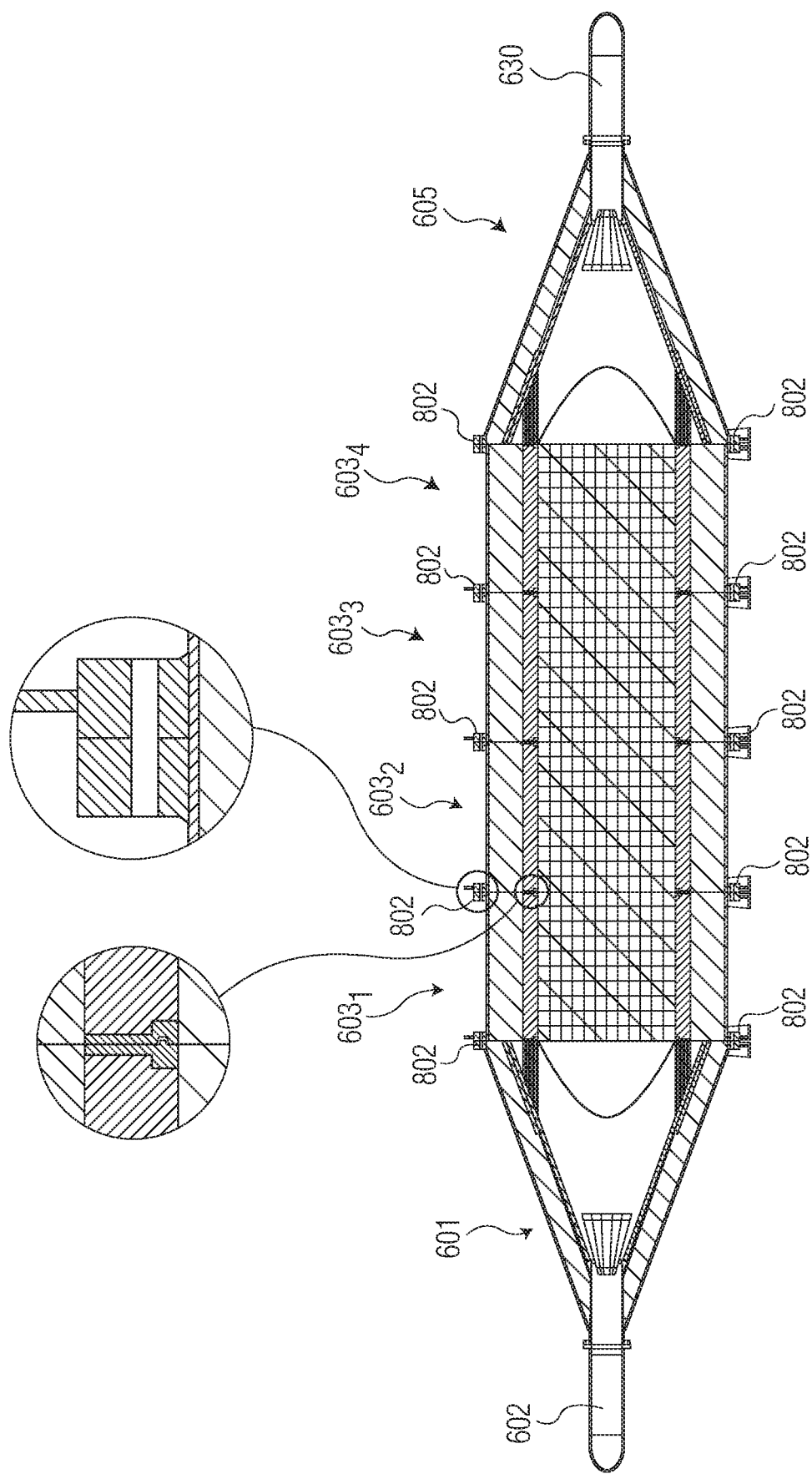
FIG. 8 is a cross-sectional view of the heat sink vessel of FIG. 6, according to one exemplary embodiment.

Referring back to FIG. 6, when assembled, as shown, for example, in FIG. 8, fluid may flow into vessel 600 via first pipe 602, pass through first section 601, one or more intermediary sections 603, second section 605, and exit vessel 600 via second pipe 630. As further illustrated in FIG. 8, a sairset mortar 802 may be applied to one or more flanges inside of a bolt circle to seal joints into place. For example, between second flange 724 of a first intermediary section 603$_1$ and first flange 722 of a second intermediary section 603$_2$, sairset mortar 802 may be applied to seal the joint into place.

Further, as illustrated in both FIGS. 6 and 8, each first section 601, intermediary section 603, and second section 605 may include a support 632. Support 632 may be positioned to support each section 601, 603, 605 when vessel 600 is fully assembled. Still further, in some embodiments, each section 601, 603, 605 may be formed in sections of approximately 2 m. For example, each section 601, 603, 605 may be formed in sections of between about 1 m and about 10 m. In some embodiments, each section 601, 603, 605 may be formed in sections greater than about 10 m. As the dimensions of each section grow, the heating storage element may grow accordingly.

Figure 9:
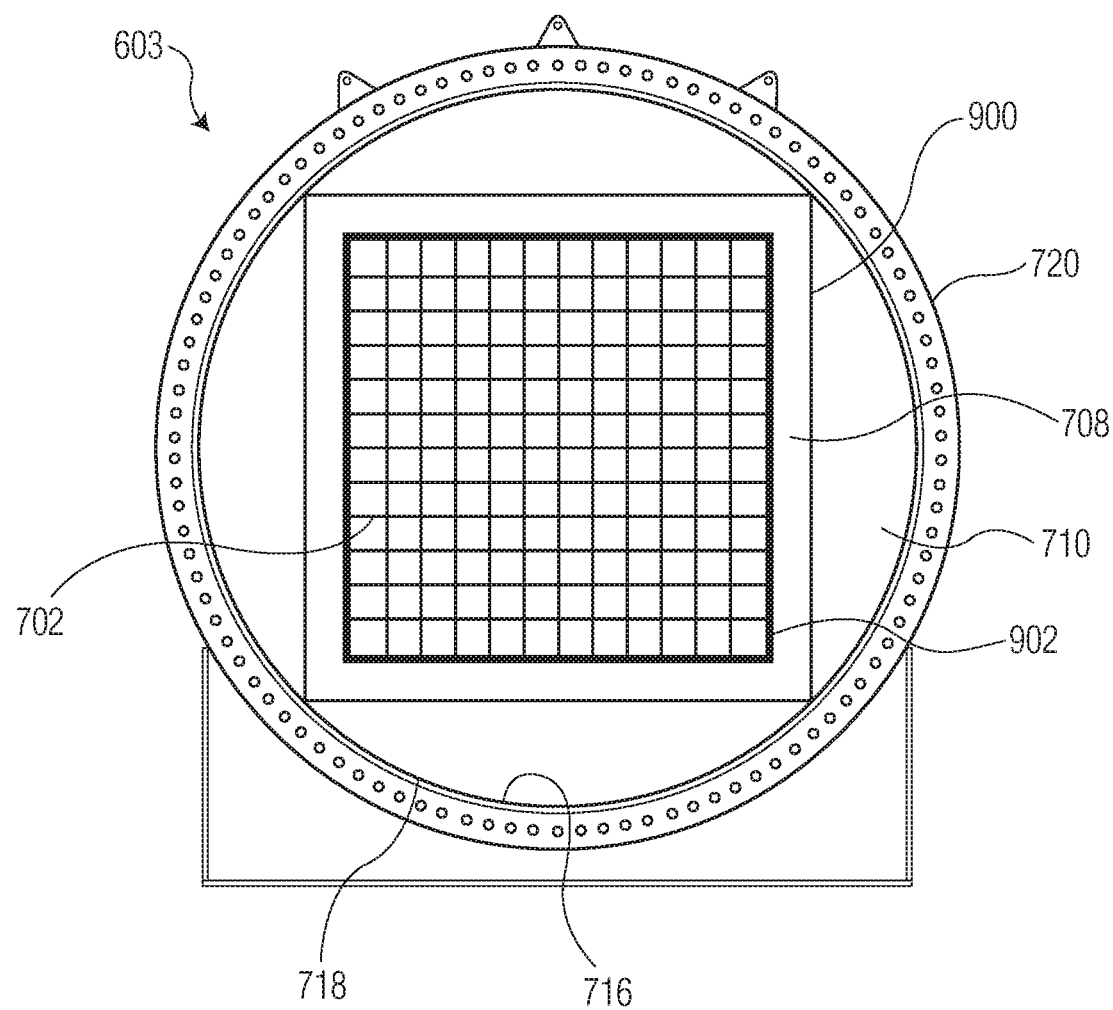
FIG. 9 is a cross-sectional view of an intermediary region of the heat sink vessel shown in FIG. 6, according to one exemplary embodiment.

FIG. 9 is a cross-sectional view of intermediary section 603, according to one embodiment. Middle refractory 710 may include a polygon-shaped opening 900 formed therein. For example, as illustrated, middle refractory 710 may include a quadrilateral-shaped opening 900. Opening 900 may be configured to receive insulation 708 and heating media 702. For example, insulation 708 may be positioned at least partially within opening 900. Between insulation 708 and heating media 702 may be joint seal 902.

Figure 10A:
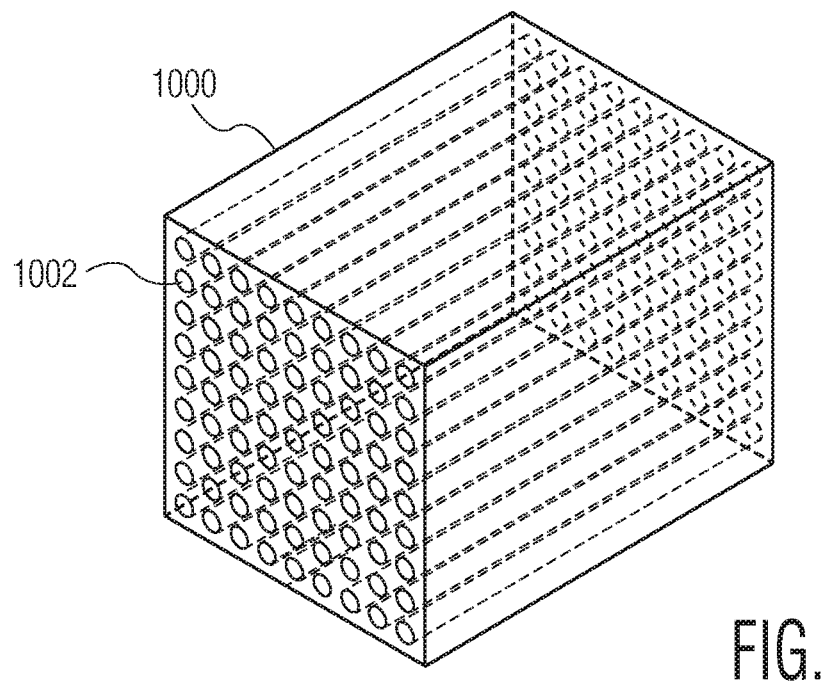
FIGS. 10A, 10B, and 10C illustrate multiple views of a heating media used in the heat sink vessel of FIG. 6, according to one exemplary embodiment.
Figure 10B:
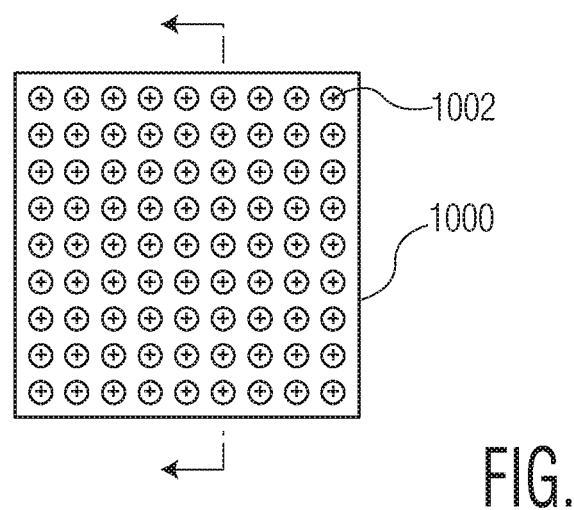
Figure 10C:
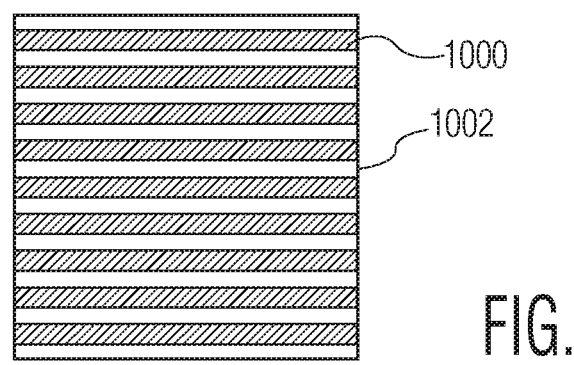

FIG. 10A illustrates a perspective view of a heating media 1000 which may be used with the heat sink vessel 600 shown in FIG. 6, according to one exemplary embodiment. FIG. 10B illustrates a cross-sectional view of heating media 1000 illustrated in FIG. 10A along the A-A line, according to one exemplary embodiment. FIG. 10C illustrates a cross-sectional view of heating media 1000 illustrated in FIG. 10A along to B-B line, according to one exemplary embodiment. Heating media 1000 may be formed of cordierite. In some embodiments, heating media 1000 may be formed of cordierite mesh. Heating media 1000 may have a specific heat ranging from about 0.8 kJ/kgK to about 1.20 kJ/kgK. In some embodiments, heating media 1000 may have a specific heat ranging from about 0.9 kJ/kgK to about 1.15 kJ/kgK. Heating media 1000 may have a density range between about 1900 kg/m$^3$ to about 2500 kg/m$^3$. Heating media 1000 may have an operating temperature range that exceeds 1000° C. In some embodiments, heating media 1000 may have an operating temperature range between about 0° C. to about 1500° C. Heating media 1000 may have a yield rupture exceeding about 450 MPa. In some embodiments, heating media 1000 may have a yield rupture of approximately 480 MPa. Heating media 1000 may have a coefficient of expansion of about $1.7 \times 10^{-6}$ m/mK. Heating media 1000 may have a thermal conductivity of about 3.0 W/mK.

As illustrated, heating media 1000 may be substantially block-shaped. Heating media 1000 may include one or more openings 1002 formed therein. In some embodiments, heating media 1000 may include regular geometry to provide for flow analysis modeling. In some embodiments, one or more openings 1002 may be substantially round. For example, heating media 1000 may be a block that is between about 30% –45% porous (e.g., 3×3, 9×9, 12×2, and up to 15×15 opening pattern for a single block). The porous nature of heating media 1000 provides a greater amount of surface area.

Figure 11:
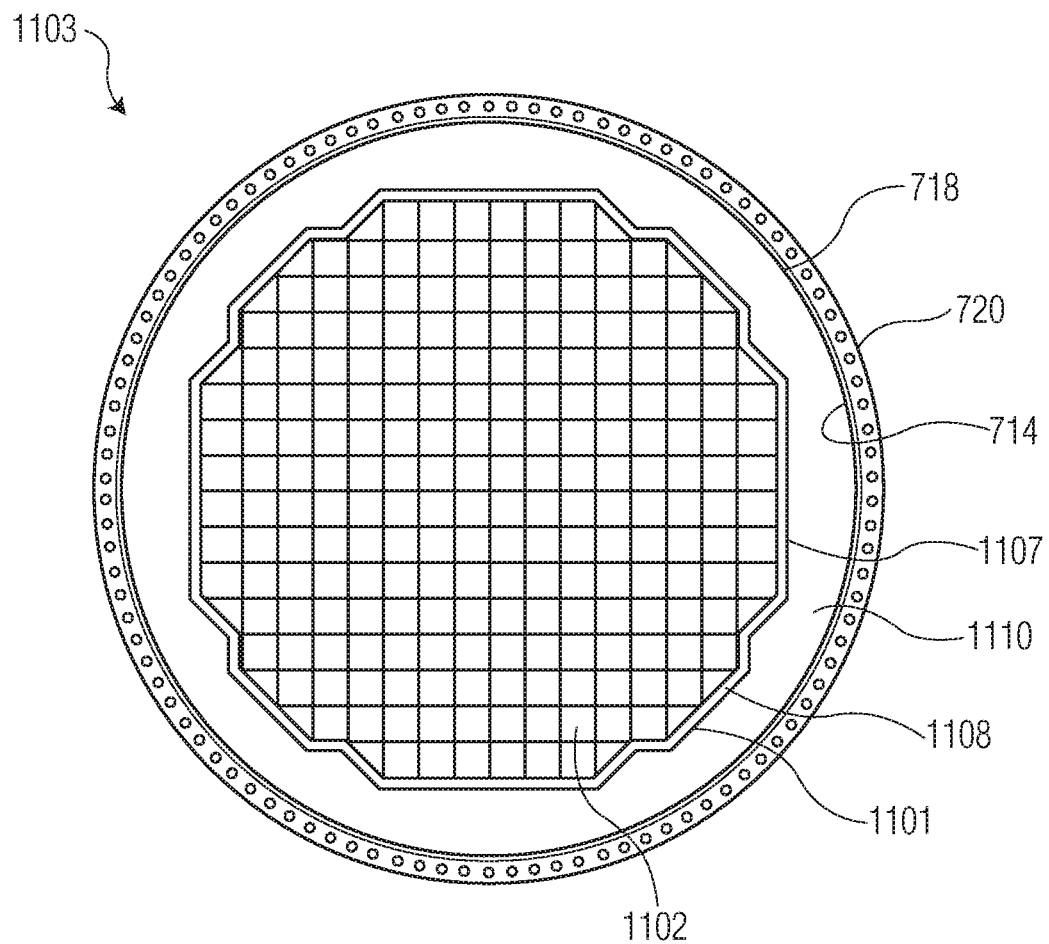
FIG. 11 is a cross-sectional view of an intermediary region of the heat sink vessel shown in FIG. 7, according to one exemplary embodiment.

FIG. 11 is a cross-sectional view of intermediary section 1103, according to one embodiment. Intermediary section 1103 is similar to intermediary section 603. For example, intermediary section 1103 includes anchor cage 714, thermal blanket 718, and outer jacket 720. Intermediary section 1103 may also include insulation 1108, refractory 1110, and heating media 1102. Insulation 1108, refractory 1110, and heating media 1102 may be similar to insulation 708, middle refractory 710, and heating media 702, respectively, but may differ in shape. Insulation 1108 may include opening 1107 formed therein. As illustrated, opening 1107 may be irregularly shaped. Opening 1107 may be configured to receive insulation 1108 and heating media 1102. For example, insulation 1108 may be positioned at least partially within opening 1107. Between insulation 1108 and heating media 1102 may be joint seal 1101. Joint seal 1101 may couple insulation 1108 to heating media 1102.

Several examples of vessels have been discussed above in conjunction with FIGS. 1A, 1B, 6, and 7. The following discussion illustrates various heating media (e.g., 126 in FIG. 1A, 702 in FIG. 7) that may be utilized with the one or more vessels provided above.

Figure 2:
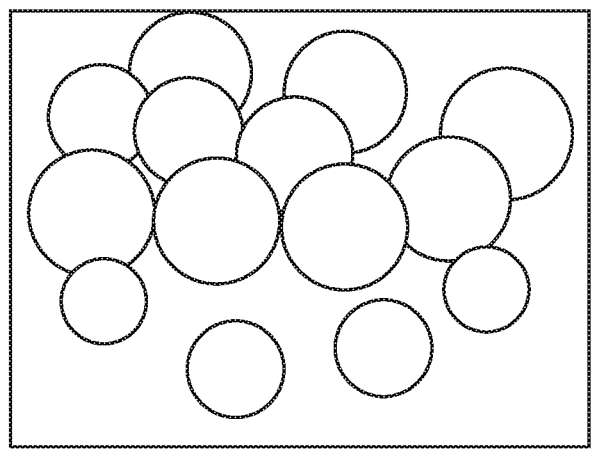
FIG. 2 illustrates a heating media which may be used with the heat sink vessel shown in FIG, 1 A, according to one embodiment.

FIG. 2 illustrates aluminum oxide in spherical form. In some embodiments, the spheres may have a diameter between about 5 mm to about 50 mm.

As another example, Cordierite is a "honeycomb" structure that has a chemistry that includes magnesium-alumina-silicate. This material may be formed in a uniform structure that produces walled tubes that allow for uniform flow of the working fluid and improved heat storage. The specific heat of this cordierite is 1.15 kJ/kgK and the density is 1900 kg/m$^3$. In one example, a total mass 318 m-tons of cordierite stores about 20 MWh of thermal energy.

Figure 3A:
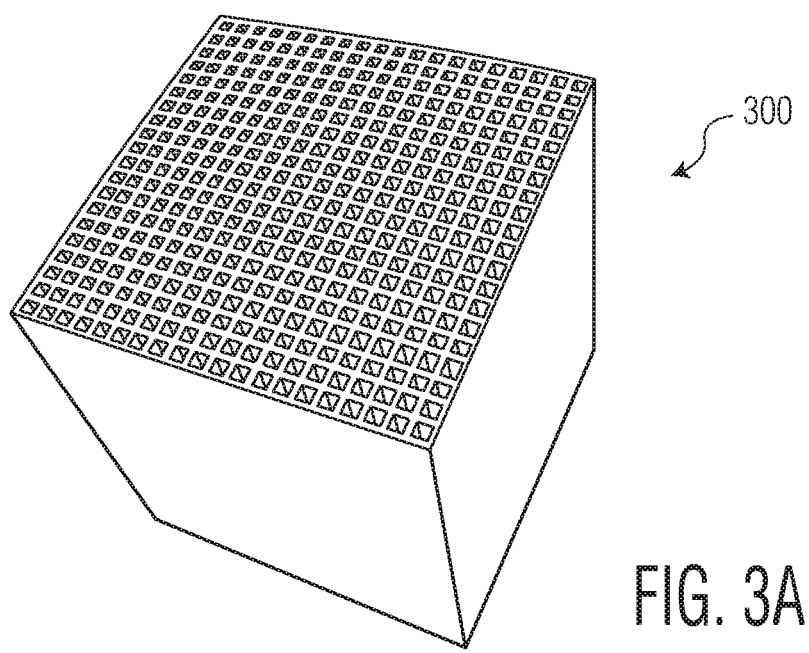
FIG. 3A illustrates a heating media which may be used with the heat sink vessel shown in FIGS. 1A 6, 12A, and 13, according to one embodiment.

FIG. 3A illustrates a cordierite honeycomb 300, according to one embodiment.

Each of the materials are regular in geometry, and are, thus, more easily modelled and may be readily purchased to create test vessels to confirm heat sink behavior. In some examples, materials with irregular geometry and suitable specific heat and density may be used to create test vessels.

Figure 3B:
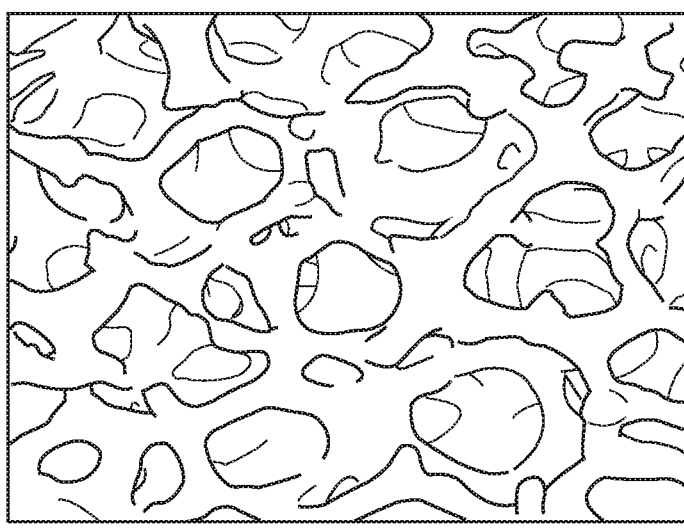
FIG. 3B illustrates a heating media which may be used with the heat sink vessel shown in FIGS. 1A 6, 12A, and 13, according to one embodiment.

FIG. 3B illustrates a cordierite block 350, according to one embodiment. As illustrated, cordierite block 350 may be embody a mesh-like material. Cordierite block 350 may have a porosity between about 30% and about 45%. In some embodiments, cordierite block 350 may have a porosity greater than about 45%.

Figure 4A:
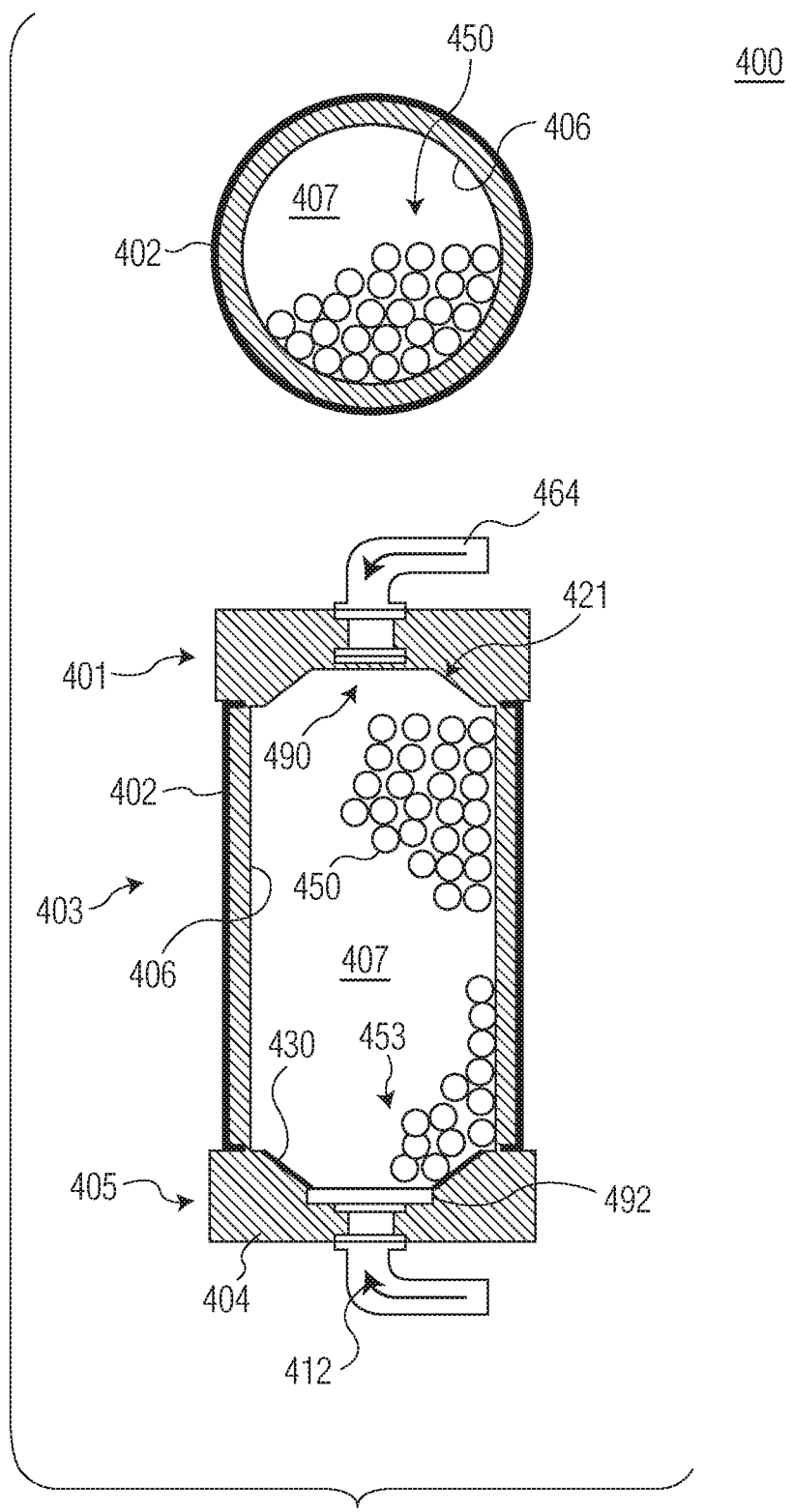
FIG. 4A illustrates a heat sink vessel having heating media disposed therein, according to one embodiment.

FIG. 4A illustrates a vessel 400 having heating media 450 disposed in inner volume 407 of vessel 400, according to one embodiment. In this embodiment, heating media 450 are spherically shaped. Although not shown, in some embodiments heating media 450 may take the form of cordierite block 300 or 350 illustrated above in conjunction with FIGS. 3A or 3B. Vessel 400 is similar to vessel 100. Vessel 400 includes upper section 401, middle section 403, and lower section 405. Upper section 401 includes upper refractory 421. Middle section 403 includes middle refractory 406 and middle jacket 402, at least partially surrounding middle refractory 406. Lower section 405 includes lower refractory 404 and perforated cone liner 430 positioned within lower refractory 404. Upper inlet 464 is in communication with opening 490 formed in upper refractory 421. Lower inlet 412 is in communication with opening 453 of lower refractory 404. Upper inlet 464 and lower inlet 412 provide access to and egress from inner volume 407 of vessel 400.

Figure 4B:
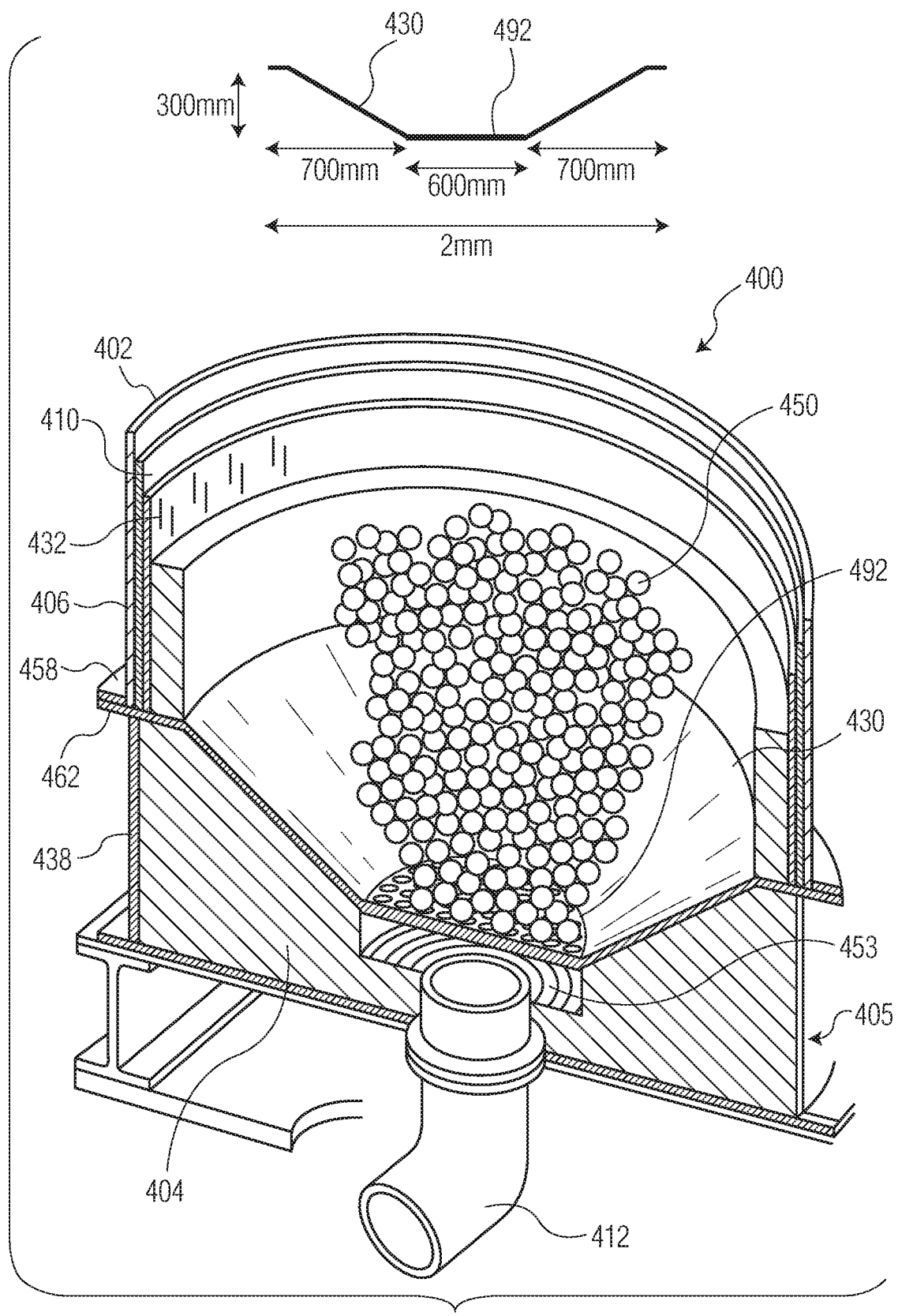
FIG. 4B illustrates a more detailed cross sectional view of the heat sink vessel of FIG. 4A, according to one embodiment.

FIG. 4B is a more detailed partial cross-sectional view of the vessel 400, according to one embodiment. As shown, middle thermal blanket 410 and anchor cage 432 are positioned between middle jacket 402 and middle refractory 406, similarly to vessel 100 in FIG. 1A. Lower section 405 further includes lower outer jacket 438 at least partially surrounding lower refractory 404. Flange 462 of lower section 401 interfaces with flange 458 of middle section 403.

In one particular example, perforated cone liner 430 has a height of about 300 mm, a thickness of about 3 mm, a first diameter of about 2 m, and a second diameter of about 600 mm. Perforated plate 492 has a thickness of about 14 mm.

Figure 5:
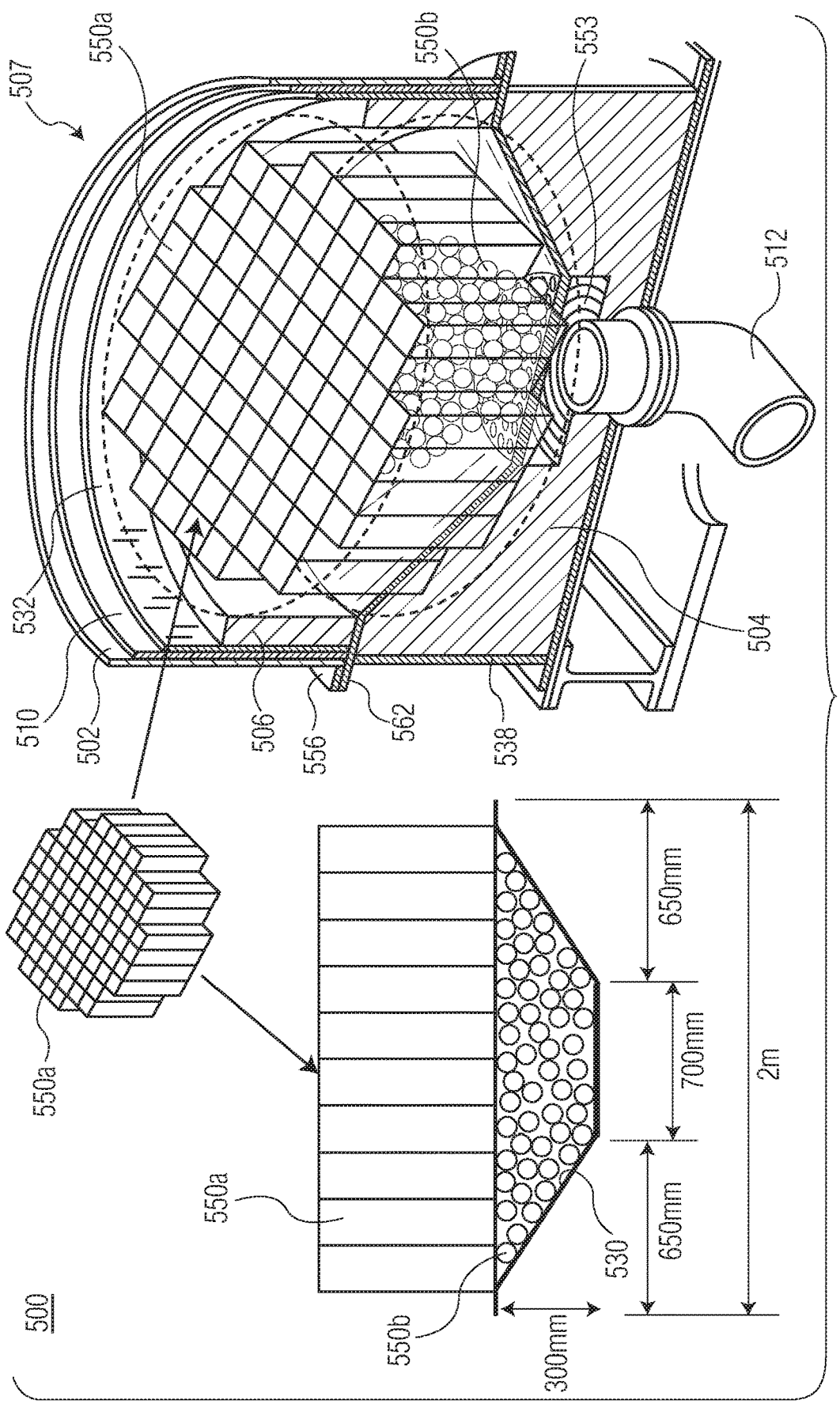
FIG. 5 illustrates a cross sectional view of a heat sink vessel having heating media disposed therein, according to one embodiment.

FIG. 5 illustrates a vessel 500 having two types of heating media (media 550a and media 550b) disposed in inner volume 507 of vessel 500, according to one embodiment. Heating media 550a may be honeycomb shaped, and may be formed from cordierite. Heating media 550b may be spherically shaped (i.e., as pebbles). For example, heating media 550a may be positioned atop heating media 550b, with heating media 550b filling a perforated cone liner 530 of lower refractory 504. This arrangement may aid in directing the gas flow into one or more passages formed in heating media 550*a*. Heating media 550*b* also may aid in supporting the weight of heating media 550*a*.

Vessel 500 is similar to vessel 100 and vessel 400. Vessel 500 includes upper section (not shown), middle section 503, and lower section 505. Middle section 503 includes middle jacket 502, middle thermal blanket 510, anchor cage 532, and middle refractory 506, arranged in a similar fashion to like numbered items in FIG. 1A. Middle jacket 502 at least partially surrounds middle thermal blanket 510. Middle thermal blanket 510 at least partially surrounds anchor cage 532. Anchor cage 532 at least partially surrounds middle refractory 506.

Lower section 505 includes lower refractory 504 and perforated cone liner 530 positioned within lower refractory 504. Lower inlet 512 is in communication with opening 553 of lower refractory 504.

In one particular example, perforated cone liner 530 has a height of about 300 mm, a thickness of about 3 mm, a first diameter of about 2 m, and a second diameter of about 700 mm. Perforated plate 592 near the second diameter has a thickness of about 7 mm.

Figure 12A:
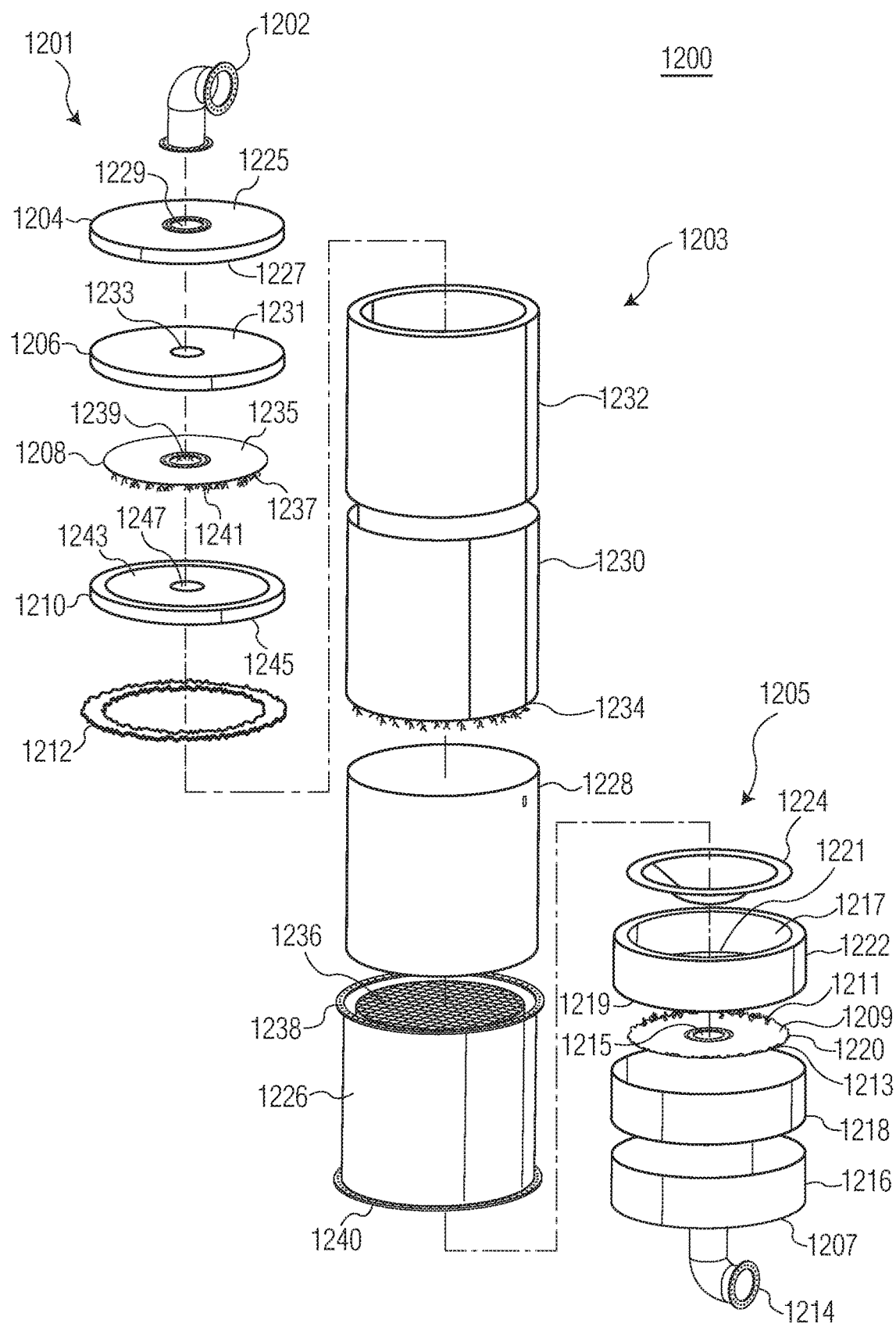
FIG. 12A is an exploded view of a heat sink vessel, according to one embodiment.

FIG. 12A is an exploded view of vessel 1200 according to example embodiments. Vessel 1200 is similar to vessel 100. Vessel 1200 may include upper section 1201, middle section 1203, and lower section 1205. Upper section 1201 may interface with middle section 1203 on a first side thereof. Lower section 1205 may interface with middle section 1203 on a second side thereof. Lower section 1205 may include lower pipe 1214, lower outer jacket 1216, lower thermal blanket 1218, lower plate 1220, lower refractory 1222, and perforated cone liner 1224. As shown, lower pipe 1214 may interface an opening (not shown) formed in bottom surface 1207 of lower outer jacket 1216. Lower thermal blanket 1218 may be positioned at least partially within lower outer jacket 1216. For example, lower thermal blanket 1218 and lower outer jacket 1216 may be concentric, with lower thermal blanket 1218 having an outer diameter less than an outer diameter of lower outer jacket 1216.

Lower plate 1220 generally includes top surface 1209, bottom surface 1213, and opening 1215 formed therein. Top surface 1209 may include one or more anchors 1211. Lower refractory 1222 generally includes top surface 1217, bottom surface 1219, and opening 1221 formed therein. Top surface 1209 of lower plate 1220 interfaces with bottom surface 1219 of lower refractory 1222, such that opening 1221 of lower refractory 1222 and opening 1215 of lower plate 1220 align. Collectively, lower refractory 1222 and lower plate 1220 are positioned within an inner circumference of lower thermal blanket 1218. When positioned within thermal blanket 1218, openings 1215, 1221 align with the opening formed in lower outer jacket 1216 and an opening in lower pipe 1214. In one embodiment, lower refractory 1222 includes a pocket (not shown) beneath lower plate 1220. The pocket may aid in facilitating gas flow within vessel 1200.

Top surface 1217 of lower refractory 1222 may be conically shaped. For example, the top surface 1217 generally slopes, negatively, towards the opening 1221 formed in lower refractory 1222. Perforated cone liner 1224 is positioned in lower refractory 1222. Perforated cone liner 1224 may generally take the form of a frustum. Thus, rather than the sloped walls of the cone coming to a point, the slope walls of perforated cone liner 1224 may come to a flat base. Thus, perforated cone liner 1224 has a first base with a first diameter and a second base with a second diameter, where the second diameter is smaller than the first diameter.

Middle section 1203 includes middle jacket 1226, middle thermal blanket 1228, anchor cage 1230 having anchors 1234, middle refractory 1232, and cordierite block 1236. Middle jacket 1226 includes upper flange 1238 and lower flange 1240. Lower flange 1240 interfaces with lower outer jacket 1216. Cordierite block 1236 may be positioned within middle jacket 1226. For example, cordierite block 1236 may be positioned within an inner circumference of middle jacket 1226. One or more anchors (not shown) may be positioned in middle jacket 1226. The anchor(s) may be configured to aid in supporting cordierite block 1236 within middle jacket 1226, as well as coupling middle section 1203 with upper section 1201. As illustrated, cordierite block 1236 may be cylindrically shaped.

Thermal blanket 1228 may be positioned within middle jacket 1226. For example, thermal blanket 1228 may be concentric with middle jacket 1226, with an outer diameter of thermal blanket 1228 being less than an inner diameter of middle jacket 1226. Thermal blanket 1228 and middle jacket 1226 may at least partially surround cordierite block 1236.

Anchor cage 1230 may be positioned within thermal blanket 1228. For example, anchor cage 1230 may be concentric with thermal blanket 1228, with an outer diameter of anchor cage 1230 being less than an inner diameter of thermal blanket 1228. In some embodiments, a fibrous board may also be positioned on the outside of anchor cage 714. A combination of fibrous board and thermal blanket may aid in improved cost and performance.

Middle refractory 1232 may be positioned within anchor cage 1230. For example, middle refractory 1232 may be concentric with anchor cage 1230, with an outer diameter of middle refractory 1232 being less than an inner diameter of anchor cage 1230. Anchor cage 1230 may include one or more anchors 1234 that aid in the positioning of middle refractory 1232 within anchor cage 1230. Middle refractory 1232 at least partially surrounds cordierite block 1236.

Upper section 1201 may include upper pipe 1202, upper outer jacket 1204, upper thermal blanket 1206, upper plate 1208, and upper refractory 1210. Although not shown, similar to lower section 1201, upper section 1203 may also include a perforated cone liner and a cordierite support frame, similar to those described above.

Upper outer jacket 1204 includes top surface 1225, bottom surface 1227, and opening 1229. Upper outer jacket 1204 may interface with upper flange 1238 of middle jacket 1226. Upper pipe 1202 interfaces opening 1229 formed in top surface 1225 of upper outer jacket 1204. Upper thermal blanket 1206 is positioned at least partially within upper outer jacket 1204. For example, upper thermal blanket 1206 and upper outer jacket 1204 may be concentric, with upper thermal blanket 1206 having outer diameter less than inner diameter of upper outer jacket 1204. Upper thermal blanket 1206 has top surface 1231 have opening 1233 formed therein. Opening 1233 may partially align with opening 1229 of upper outer jacket 1204.

Upper plate 1208 generally includes top surface 1235, bottom surface 1237, and opening 1239 formed in the upper plate 1208. Bottom surface 1237 may include one or more anchors 1241. Upper refractory 1210 generally includes top surface 1243, bottom surface 1237, and opening 1247 formed in top surface 1243. Bottom surface 1245 of upper plate 1208 interfaces with top surface 1243 of upper refractory 1210, such that opening 1247 of upper refractory 1210 and opening 1239 of upper plate 1208 align. Collectively, upper refractory 1210 and upper plate 1208 are positioned within an inner circumference of upper thermal blanket 1206. When positioned within thermal blanket 1206, openings 1239, 1247 align with opening 1229 formed in upper outer jacket 1204.

Bottom surface 1245 of the upper refractory 1210 may conically shaped. For example, bottom surface 1245 of upper refractory 1210, similar to lower refractory 1222, generally slopes towards opening 1247 formed in upper refractory 1210. In embodiments in which upper portion 1201 includes liner 1212. Liner 1212 may be positioned in bottom surface 1245 of upper refractory 1210. In some examples, liner 1212 may include a perforated plate (not shown).

In operation, fluid may enter upper pipe 1202 and travel through upper section 1201 through opening 1229 formed in upper outer jacket 1204, opening 1233 of upper thermal blanket 1206, opening 1239 of upper plate 1208, and opening 1247 of upper refractory 1210.

Figure 12B:
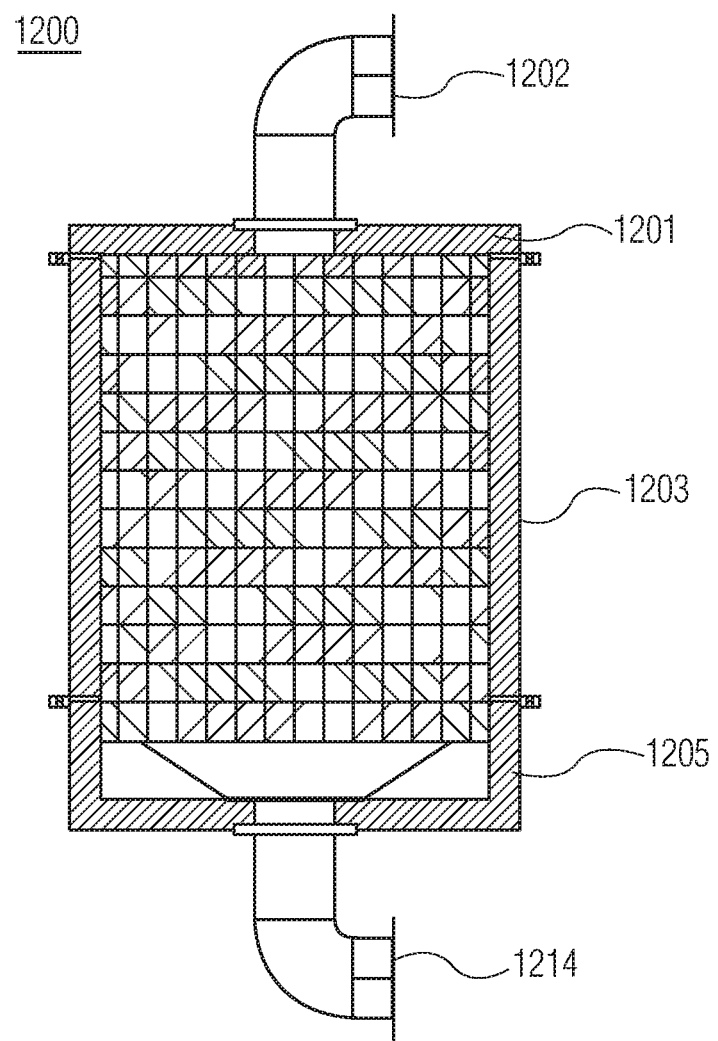
FIG. 12B is a schematic view of the heat sink vessel shown in FIG. 12A, according to one embodiment.

When assembled, as shown in FIG. 12B, fluid may flow into vessel 1200 via upper pipe 1202, pass through upper portion 1201, middle portion 1203, lower portion 1205, and exit vessel 1200 through lower pipe 1214. In some embodiments, an inlet of vessel 1200 and an outlet of vessel 1200 may switch between operational phases. For example, fluid may flow into vessel 1200 via lower pipe 1214, pass through lower portion 1205, middle portion 1203, and upper portion 1204, and exit vessel 1200 through upper pipe 1202. Accordingly, the geometry of vessel 1200 may be the same at upper portion 1201 and lower portion 1205.

Figure 12C:
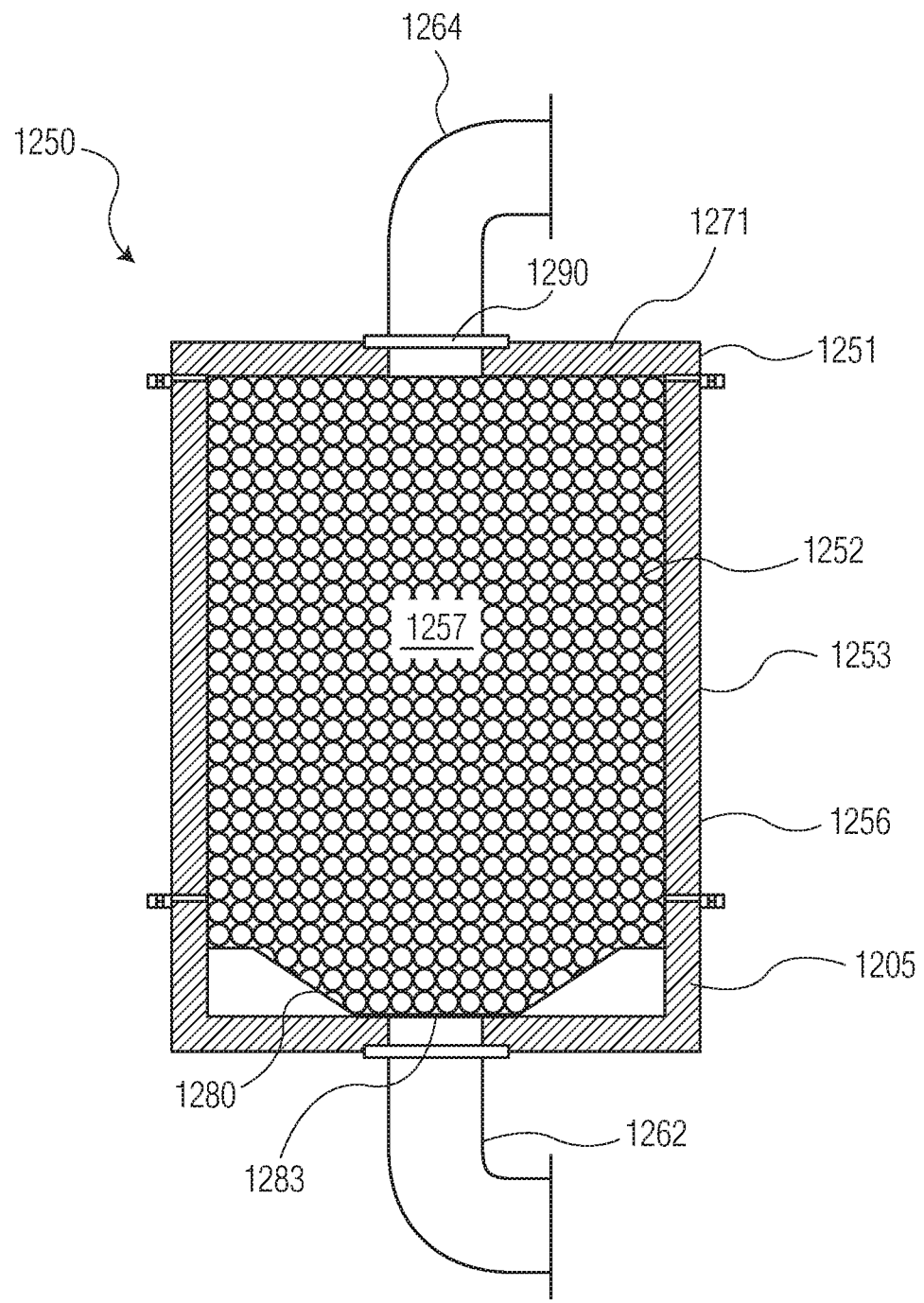
FIGS. 12C, 12D, and 12E are partial cross-sectional views of the heat sink vessel shown in FIG. 12A, according to one embodiment.
Figure 12D:
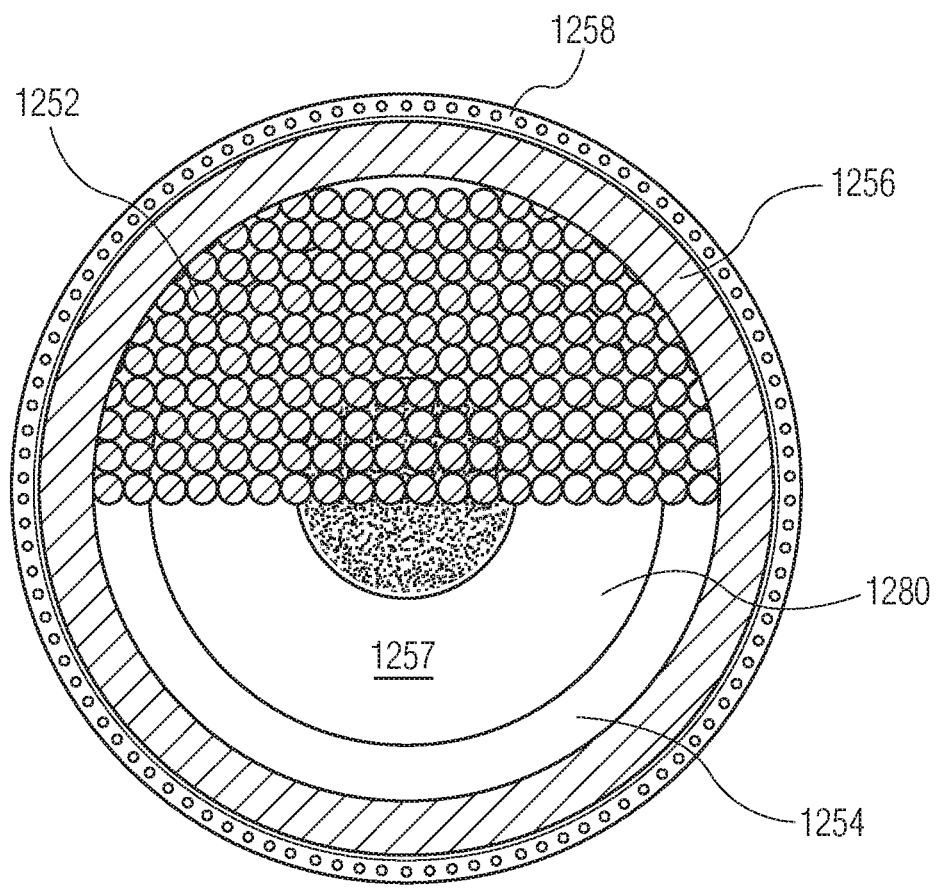
Figure 12E:
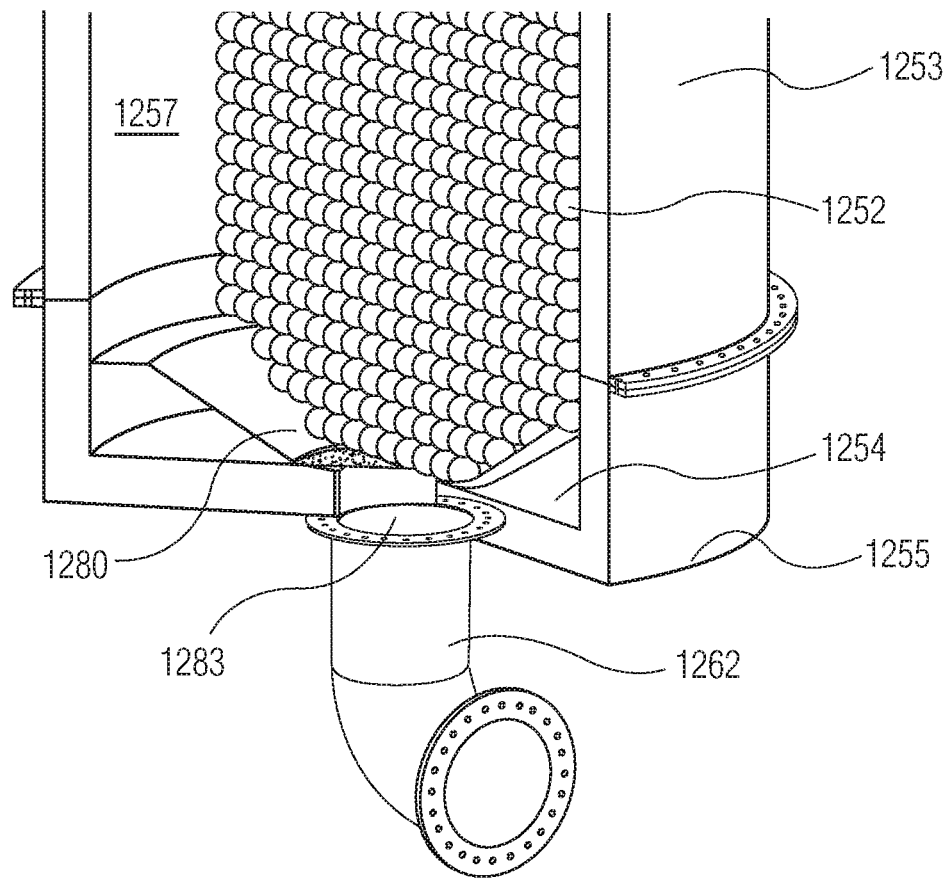

FIG. 12C illustrates vessel 1250 having heating media 1252 disposed in inner volume 1257 of vessel 1250, according to one embodiment. FIGS. 12D and 12E are more detailed partial cross-sectional views of the vessel 1250, according to one embodiment. Vessel 1250 is similar to vessel 1200. In this embodiment, heating media 1252 are spherically shaped. Vessel 1250 includes upper section 1251, middle section 1253, and lower section 1255. Upper section 1251 includes upper refractory 1271. Middle section 1253 includes middle refractory 1256 and middle jacket 1258, at least partially surrounding middle refractory 1256. Lower section 1255 includes lower refractory 1254 and perforated cone liner 1280 positioned within lower refractory 1254. Upper inlet 1264 is in communication with opening 1290 formed in upper refractory 1271. Lower inlet 1262 is in communication with opening 1283 of lower refractory 1254. Upper inlet 1264 and lower inlet 1262 provide access to and egress from inner volume 1257 of vessel 1250.

Figure 13:
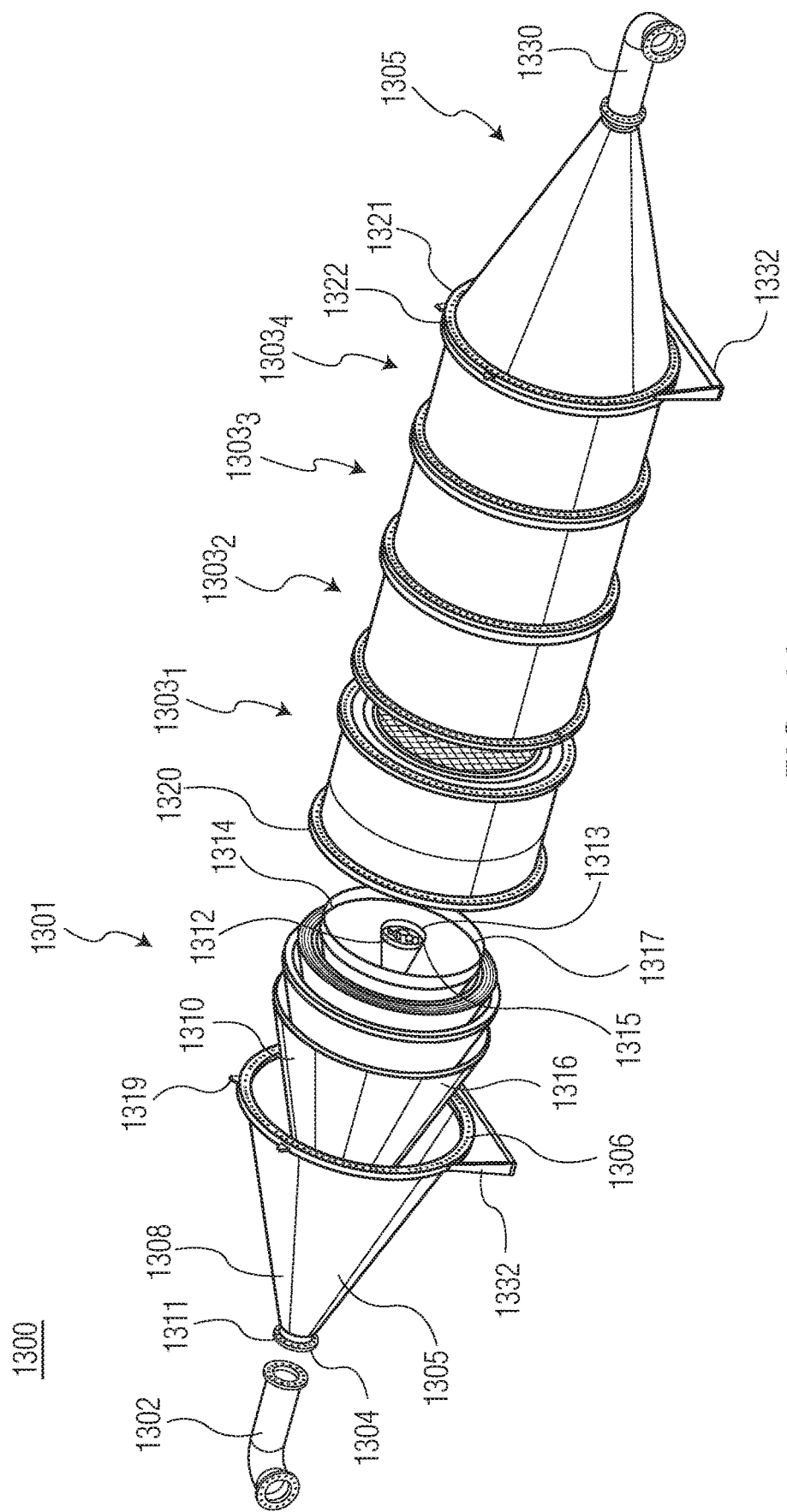
FIG. 13 is an exploded view of a heat sink vessel, according to one exemplary embodiment.

FIG. 13 is an exploded view of vessel 1300 according to one embodiment. Vessel 1300 is similar to vessels 100, 600, and 1200. Vessel 1300 may include a first section 1301, a second section 1305, and one or more intermediary sections 1303₁, 1303₂, 1303₃, and 1303₄ (hereinafter "intermediary section 1303"). Although vessel 1300 is illustrated with four intermediary sections 1303, those skilled in the art would readily understand that vessel 1300 may include as few as one intermediary section 1303. As illustrated, first section 1301 may interface with intermediary section 1303 on a first side thereof. Second section 1305 may interface with intermediary section 1303 on a second side thereof.

First section 1301 may include first pipe 1302, first outer jacket 1308, first refractory 1310, diffuser/accelerator assembly 1313, and first insulation 1314. First outer jacket 1308 may include a first surface 1304 and a second surface 1306 opposite first surface 1304. First outer jacket 1308 may further include a curved surface 1307 that extends from first surface 1304 to second surface 1306. As illustrated, curved surface 1307 may slope negatively from first surface 1304 to second surface 1306, thus forming a conically shaped outer jacket.

First pipe 1302 may interface with an opening 1311 formed in top surface 1304 of first outer jacket 1308. First refractory 1310 may include a cone-shaped body 1316. First refractory 1310 may be positioned at least partially within first outer jacket 1308. For example, first outer jacket 1308 may have a base circumference that is larger than a base circumference of first refractory 1310. Although not shown, first refractory 1310 includes an opening formed in a top surface thereof, such that the opening of first refractory 1310 at least partially aligns with opening 1311 formed in first outer jacket 1308. In other words, first refractory 1310 may be at least partially nested within first outer jacket 1308.

Diffuser/accelerator assembly 1313 may include one or more first cones liner 1312 may include a conical shaped body having a substantially circular-shaped base 1315. As shown, first cone liner 1312 may be at least partially positioned within first refractory 1310. Each first cone liner 1312 may be configured to protect an interior volume of lower refractory 1310. Each first cone liner 1312 may include a top surface (not shown) opposite substantially circular-shaped base 1315. The top surface may include an opening (not shown) that interfaces with opening formed in lower refractory 1310. The opening of first cone liner 1312 may at least partially align with an opening of first refractory 1310. Accordingly, the opening of first cone liner 1312 may be in fluid communication with first pipe 1302.

First insulation 1314 may include a conical shaped body 1317. As shown, first insulation 1314 may be at least partially positioned within first cone liner 1312. First insulation 1314 may be configured to insulate first section 1301. In some embodiments, the insulation cross-section may include first layer of pourable aluminum silicate; a second layer formed from a fibrous board of aluminate silicate that is shaped around the first layer (or, alternatively, shaped around the carbon steel form used to shape the poured layer); a third layer that includes a ceramic blanket formed from a base composition of alumina silica, that is used to complete the insulation cross section. The insulation cross section may then be inserted in the carbon steel pressure boundary. Equivalent refractory insulations may be used as well.

As such, first section 1301 may be comprised of first insulation 1314 at least partially positioned within first cone liner 1312, first cone liner 1312 at least partially positioned within first refractory 1310, and first refractory 1310 at least partially positioned within first outer jacket 1308.

Second section 1305 may be similar to first section 1303. Second section 1305 is depicted in a perspective view as compared to first section 1303, which is depicted in an exploded view. As such, those skilled in the art will readily understand that second section 1305 includes a respective second insulation at least partially positioned within a second cone liner, one or more second cone liners at least partially positioned within a second refractory, and the second refractory at least partially positioned within second outer jacket.

Because second section 1305 is similar to first section 1303, second section 1305 may also include its own diffuser/accelerator assembly that is similar to diffuser/accelerator assembly 1313 of first section 1301. The benefit of having a diffuser/accelerator assembly in second section 1305 as well as first section 1303 allows for reversibility of the flow through vessel 1300.

First section 1301 may interface with intermediary section 1303 at a first side 1320 of intermediary section 1305. Second section 1305 may interface with intermediary section 1303 at a second side 1322 of intermediary section 1303. Intermediary section 1303 is shown in more detail in FIG. 14.

Figure 14:
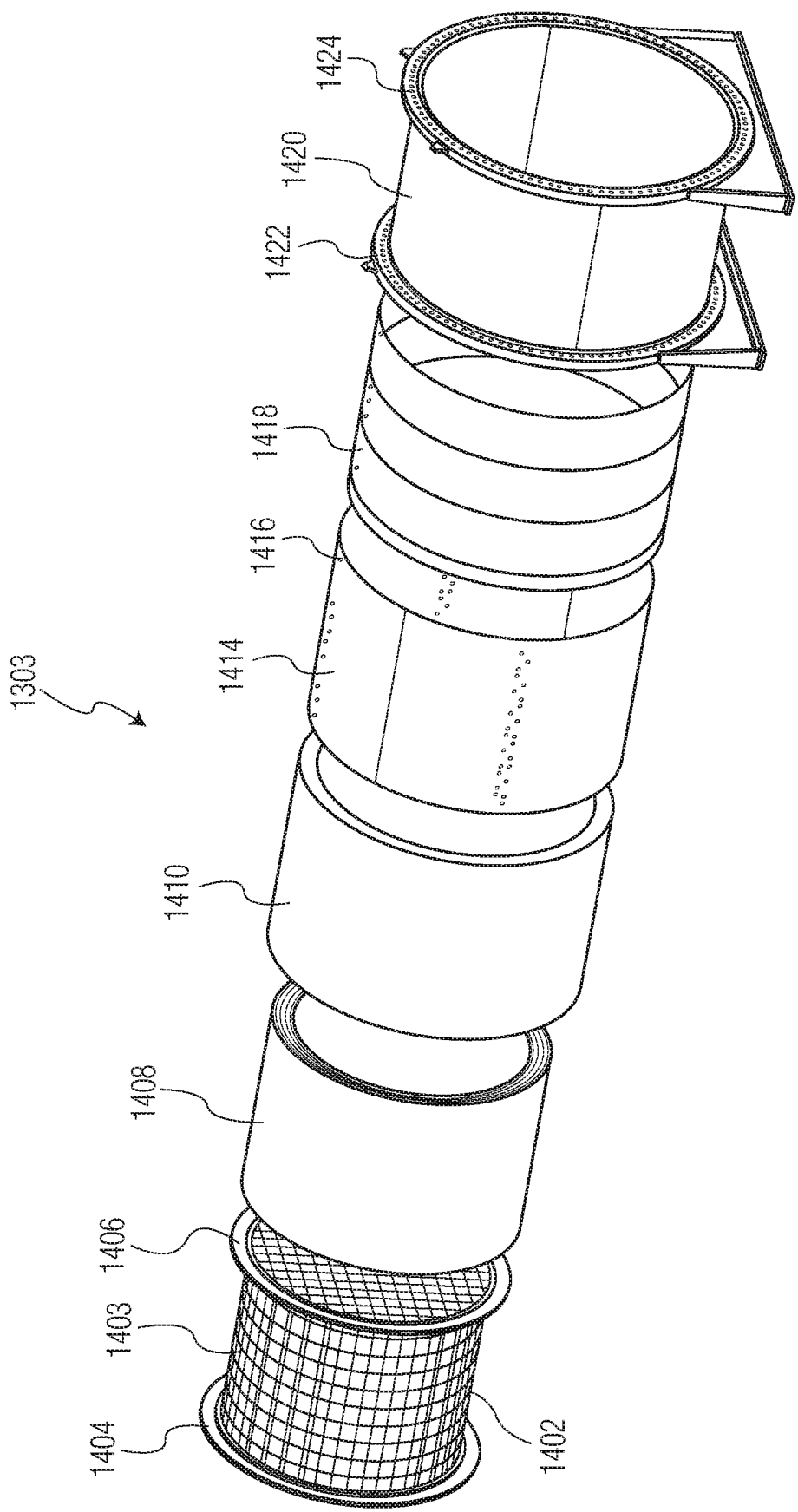
FIG. 14 is an exploded view of an intermediary region of the heat sink vessel shown in FIG. 13, according to one exemplary embodiment.

FIG. 14 is an exploded view of intermediary section 1303 of vessel 1300 according to one embodiment. Intermediary section 1303 may include at least heating media 1402, insulation 1408, refractory 1410, anchor cage 1414, thermal blanket 1418, and outer jacket 1420.

Outer jacket 1420 may include a first flange 1422 on first side 1320 and a second flange 1424 on second side 1322. In some embodiments, first flange 1422 may interface with flange 1319 of first outer jacket 1308. In some embodiments, first flange 1422 may interface with second flange 1424 of another intermediary section 1303. In some embodiments, second flange 1424 may interface with flange 1321 of second outer jacket of second section 1305. In some embodiments, second flange 1324 may interface with first flange 1422 of another intermediary section 1303.

Heating media 1402 may be positioned at least partially within outer jacket 1420. For example, heating media 1402 may be positioned within an inner circumference of middle jacket 1420. Thermal blanket 1418 may be positioned at least partially within outer jacket 1420. For example, thermal blanket 1418 may be concentric with outer jacket 1420, with an outer diameter of thermal blanket 1418 being less than an inner diameter of outer jacket 1420. Thermal blanket 1418 and outer jacket 1420 may at least partially surround heating media 1402. In some embodiments, heating media 1402 may be formed from cordierite. For example, heating media 1402 may take the form of a substantially cylindrical cordierite block. In some embodiments, heating media 1402 may be formed from a ceramic mesh. For example, heating media 1402 may be formed from one of alumina oxide, alumina silica, aluminum oxide, or any suitable ceramic material.

Anchor cage 1414 may be positioned within thermal blanket 1418. For example, anchor cage 1414 may be concentric with thermal blanket 1418, with an outer diameter of anchor cage 1414 being less than an inner diameter of thermal blanket 1418. In some embodiments, a fibrous board may also be positioned on the outside of anchor cage 714. A combination of fibrous board and thermal blanket may aid in improved cost and performance. Middle refractory 1410 may be positioned within anchor cage 1414. For example, middle refractory may be concentric with anchor cage 1414, with an outer diameter of middle refractory 1410 being less than an inner diameter of anchor cage 1414. Anchor cage 1414 may include one or more anchors 1416 that aid in positioning middle refractory 1410 within anchor cage 1414. Further, in some embodiments, one or more anchors 1416 may aid in positioning anchor cage 1414 within thermal blanket 1418.

Middle refractory 1410 may at least partially surround heating media 1402. Insulation 1408 may be positioned at least partially within middle refractory 1408. Insulation 1408 may be cylindrically-shaped. Insulation 1408 may be configured to at least partially surround heating media 1402. For example, heating media 1402 may include a body 1403 having a first flange 1404 and a second flange 1406. Insulation 1408 may be positioned about body 1403 between first flange 1404 and second flange 1406.

Figure 15:
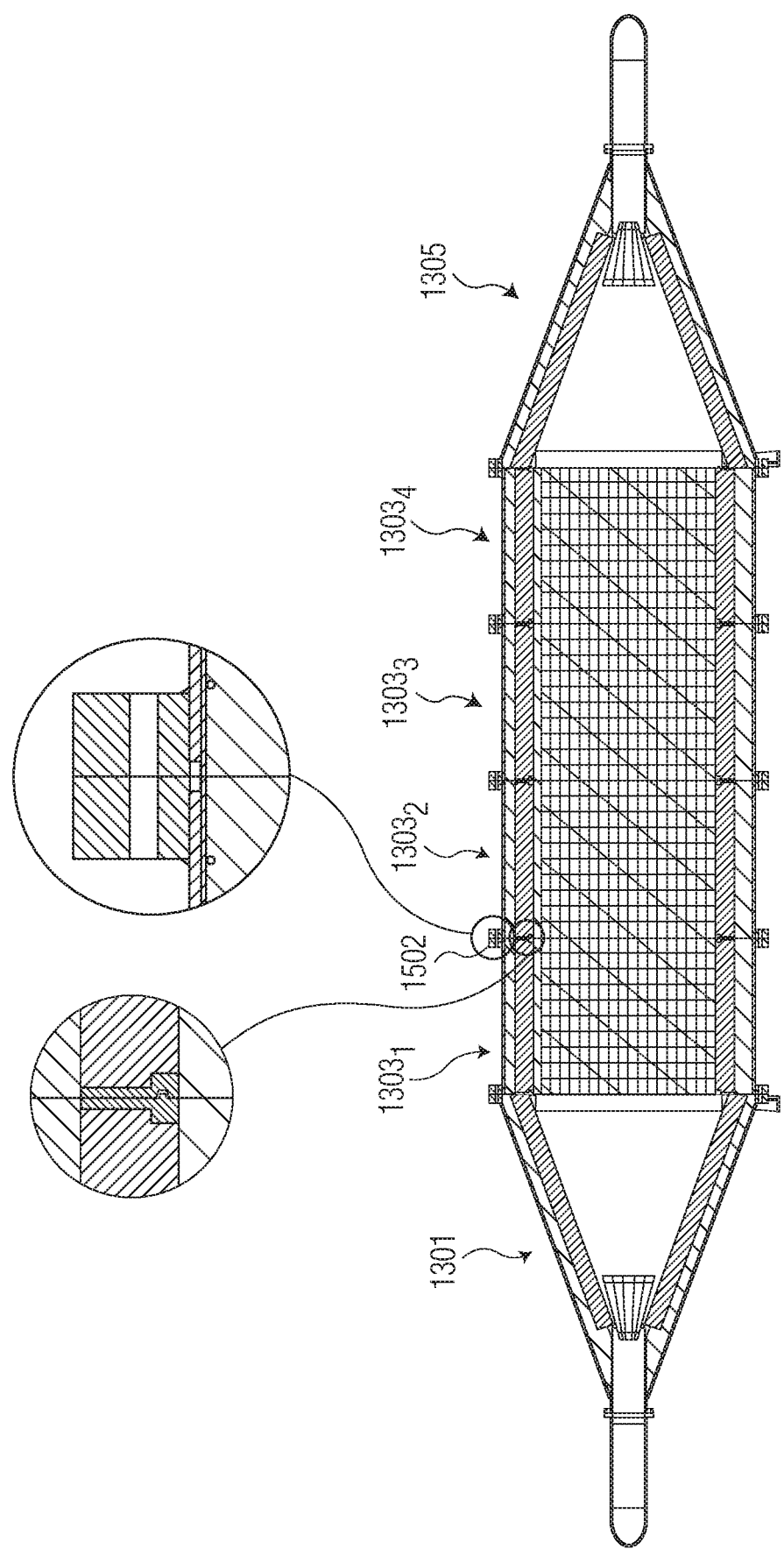
FIG. 15 is a cross-sectional view of the heat sink vessel of FIG. 13, according to one exemplary embodiment.

Referring back to FIG. 13, when assembled, as shown, for example, in FIG. 15, fluid may flow into vessel 1300 via first pipe 1302, pass through first section 1301, one or more intermediary sections 1303, second section 1305, and exit vessel 1300 via second pipe 1330. As further illustrated in FIG. 15, a sairset mortar 1502 may be applied to one or more flanges inside of a bolt circle to seal joints into place. For example, between a second flange of a first intermediary section 13031 and a first flange of a second intermediary section 13032, sairset mortar 1502 may be applied to seal the joint into place.

Further, as illustrated in both FIGS. 13 and 15, each first section 1301, intermediary section 1303, and second section 1305 may include a support 1332. Support 1332 may be positioned to support each section 1301, 1303, 1305 when vessel 1300 is fully assembled. Still further, in some embodiments, each section 1301, 1303, and 1305 may be formed in sections of approximately 2 in.

Figure 16:
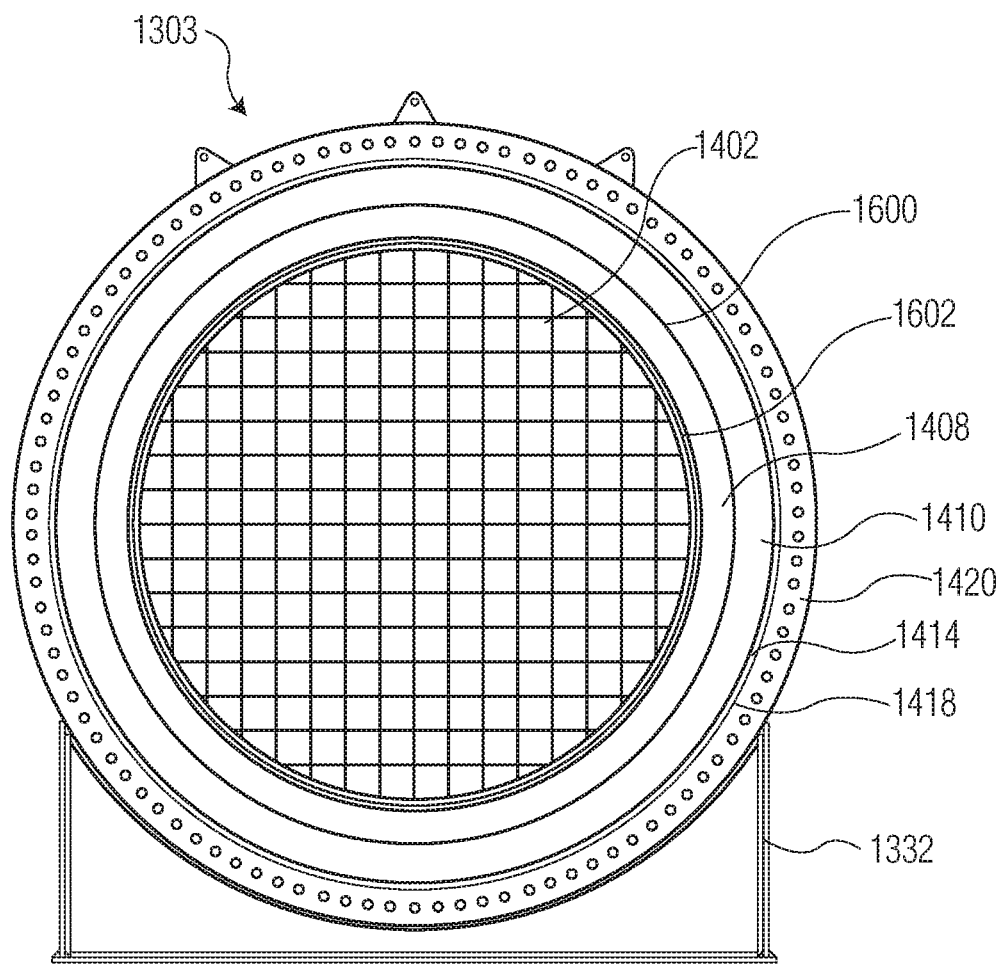
FIG. 16 is a cross-sectional view of an intermediary region of the heat sink vessel shown in FIG. 13, according to one exemplary embodiment.

FIG. 16 is a cross-sectional view of intermediary section 1303, according to one embodiment. Middle refractory 1410 may include a substantially circular-shaped opening 1600 formed therein. Opening 1600 may be configured to receive insulation 1408 and heating media 1402. For example, insulation 1408 may be positioned at least partially within opening 1600. Between insulation 1408 and heating media 1402 may be joint seal 1602.

Figure 17A:
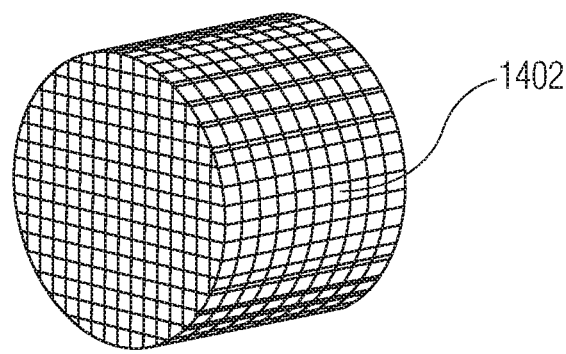
FIGS. 17A, 17B, and 17C illustrate one or more views of cordierite block, according to example embodiments.
Figure 17B:
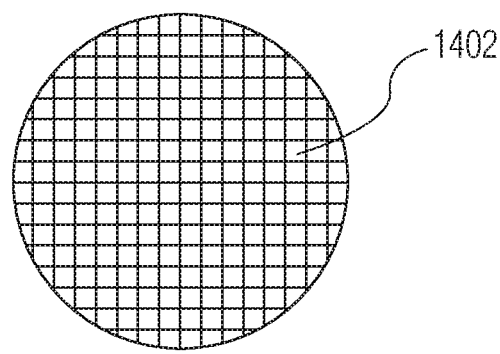
Figure 17C:
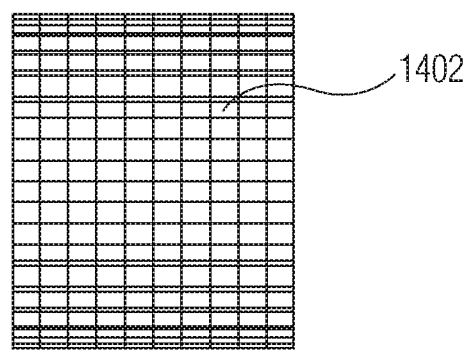

FIGS. 17A-17C illustrates one or more views of cordierite block 1402, according to example embodiments. As illustrated, cordierite block 1402 may be substantially cylindrically shaped. Accordingly, cordierite block 1402 may have a substantially circular-shaped face.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. An apparatus, comprising:
a body defining an interior volume, the body configured to circulate a working fluid therethrough, the body comprising:
an intermediary portion;
an upper section configured to interface with the intermediary portion at a first side of the intermediary portion, the upper section configured to transfer the working fluid into and out of the intermediary portion via the first side;
a lower section configured to interface with the intermediary portion at a second side of the intermediary portion, the lower section configured to transfer the working fluid into and out of the intermediary portion via the second side,
wherein the intermediary portion comprises:
a refractory defining an inner volume of the intermediary portion, the refractory having an opening formed therethrough, the refractory formed from a material that comprises a ceramic;
a jacket at least partially surrounding the refractory, the jacket formed from a material that comprises magnesium alumina silica; and
a heating media disposed in the inner volume of the refractory, the heating media configured to store heat during processing the heating media including a plurality of tubes,
wherein the heating media is in direct contact with the working fluid, the working fluid passing directly through the heating media via the plurality of tubes, and
wherein the working fluid is configured to charge and discharge the heating media over one or more respective heating and discharge cycles.

2. The apparatus of claim 1, further comprising:
an insulation layer disposed between the refractory and the heating media.

3. The apparatus of claim 1, further comprising:
a thermal blanket at least partially surrounding the refractory; and
an anchor cage disposed between the thermal blanket and the refractory, the anchor cage comprising one or more anchors configured to support both the thermal blanket and the refractory.

4. The apparatus of claim 1, wherein the heating media comprises a honeycomb shaped structure.

5. The apparatus of claim 1, wherein the heating media comprises a mesh shaped structure.

6. The apparatus of claim 1, wherein at least one section among the first section and the second section comprises a cone liner.

7. The apparatus of claim 6, wherein the cone liner is configured to diffuse the working fluid when the working fluid enters the at least one section for transferring the working fluid into the intermediary portion.

8. The apparatus of claim 6, wherein the cone liner is configured to accelerate a flow of the working fluid when the working fluid exits the at least one section for transferring the working fluid out of the intermediary portion.

9. The apparatus of claim 1, wherein the apparatus is operable within a system configured for reversible flow of the working fluid for the one or more heating and discharge cycles.

10. The apparatus of claim 1, further comprising:
one or more anchors positioned on the jacket.

11. The apparatus of claim 1, further comprising:
a steel outer shell having a diameter greater than a diameter of the heating media, the steel outer shell configured to encase the body.

12. The apparatus of claim 1, wherein the heating media comprises a specific heat greater than 0.7 kJ/kgK and a density greater than or equal to 1900 kg/m$^3$.

13. The apparatus of claim 1, wherein the heating media is formed from a material comprising cordierite.

14. The apparatus of claim 13, wherein the heating media comprises a specific heat of 1.15 kJ/kgK and a density of 1900 kg/m$^3$.

15. The apparatus of claim 1, wherein the heating media comprises an operating temperature range between about 0° C. to about 1500° C.

16. The apparatus of claim 1, wherein the ceramic comprises magnesium alumina silica.

17. An apparatus, comprising:
a body defining an interior volume, the body configured to circulate a working fluid therethrough, the body comprising:
a refractory defining an inner volume of the interior volume, the refractory having an opening formed therethrough;
a jacket at least partially surrounding the refractory, the jacket formed from a material that comprises magnesium alumina silica;
a heating media disposed in the inner volume of the refractory, the heating media configured to store heat during processing the heating media including a plurality of tubes;
a thermal blanket at least partially surrounding the refractory; and
an anchor cage disposed between the thermal blanket and the refractory, the anchor cage comprising one or more anchors configured to support both the thermal blanket and the refractory,
wherein the heating media is in direct contact with the working fluid, the working fluid passing directly through the heating media via the plurality of tubes.

18. An apparatus, comprising:
a body defining an interior volume, the body configured to circulate a working fluid therethrough, the body comprising:
a heating media configured to store heat during processing, the heating media including a plurality of tubes, the heating media in direct contact with the working fluid, the working fluid passing directly through the heating media via the plurality of tubes,
a refractory defining an inner volume of the interior volume, the refractory having an opening formed therethrough, the heating media disposed in the inner volume of the refractory, the refractory forming a first insulation layer,
a fibrous board at least partially surrounding the refractory, the fibrous board forming a second insulation layer,
a thermal blanket at least partially surrounding the refractory, the thermal blanket forming a third insulation layer, and
a jacket at least partially surrounding the refractory, the jacket formed from a material that comprises magnesium alumina silica; and
a steel outer shell configured to encase the body.

19. An apparatus, comprising:
a body defining an interior volume, the body configured to circulate a working fluid therethrough, the body comprising:
a refractory defining an inner volume of the interior volume, the refractory having an opening formed therethrough;
a jacket at least partially surrounding the refractory, the jacket formed from a material that comprises magnesium alumina silica; and
a heating media disposed in the inner volume of the refractory, the heating media configured to store heat during processing, the heating media is formed from a material comprising cordierite and includes a plurality of tubes,
wherein the heating media is in direct contact with the working fluid, the working fluid passing directly through the heating media via the plurality of tubes.

* * * * *